(12) United States Patent
Maeng et al.

(10) Patent No.: US 9,385,882 B2
(45) Date of Patent: Jul. 5, 2016

(54) METHOD AND APPARATUS FOR PHONE COMMUNICATION USING HOME NETWORK

(75) Inventors: Je-Young Maeng, Gyeonggi-do (KR); Ho-Yeon Park, Seoul (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 436 days.

(21) Appl. No.: 13/352,995

(22) Filed: Jan. 18, 2012

(65) Prior Publication Data

US 2012/0182920 A1   Jul. 19, 2012

(30) Foreign Application Priority Data

Jan. 18, 2011   (KR) ......................... 10-2011-0005163
May 9, 2011    (KR) ......................... 10-2011-0043690

(51) Int. Cl.
*H04L 12/28* (2006.01)
*H04L 29/06* (2006.01)

(52) U.S. Cl.
CPC ............. *H04L 12/2832* (2013.01); *H04L 63/08* (2013.01); *H04L 63/12* (2013.01); *H04L 2012/2841* (2013.01); *H04L 2012/2849* (2013.01)

(58) Field of Classification Search
None
See application file for complete search history.

(56) References Cited

U.S. PATENT DOCUMENTS

| | | | |
|---|---|---|---|
| 6,888,821 B2 * | 5/2005 | Rasanen et al. | 370/352 |
| 6,910,068 B2 * | 6/2005 | Zintel et al. | 709/220 |
| 2002/0141384 A1 | 10/2002 | Liu et al. | |
| 2003/0219011 A1 * | 11/2003 | Han | 370/352 |
| 2006/0128364 A1 | 6/2006 | Costa-Requena et al. | |
| 2007/0019630 A1 | 1/2007 | Kashimoto et al. | |
| 2008/0240400 A1 | 10/2008 | Mairs et al. | |

(Continued)

FOREIGN PATENT DOCUMENTS

| | | |
|---|---|---|
| CN | 101073248 | 11/2007 |
| CN | 101909192 | 12/2010 |

(Continued)

OTHER PUBLICATIONS

Chinese Office Action dated Jun. 2, 2015 issued in counterpart application No. 201280005725.9, 9 pages.

(Continued)

*Primary Examiner* — Timothy J Weidner
(74) *Attorney, Agent, or Firm* — The Farrell Law Firm, P.C.

(57) ABSTRACT

A method of providing a home network telephony service, in which a first mobile communication terminal having a phone call connection with a second mobile communication terminal provides a phone communication service by using a first electronic device connected to a home network of the first mobile communication terminal is provided. The method includes transmitting a call initiation request message, including an address of the first electronic device, and making a request for a phone call connection using the first electronic device in response to the phone call to the second mobile communication terminal; receiving a response message in response to the call initiation request message from the second mobile communication terminal; and transmitting a call initiation request message including the address of the second electronic device and making a request to the first electronic device to originate a call to the second electronic device.

16 Claims, 14 Drawing Sheets

(56) References Cited

U.S. PATENT DOCUMENTS

| | | |
|---|---|---|
| 2009/0135806 A1 | 5/2009 | Pulhug |
| 2009/0180486 A1* | 7/2009 | Han et al. .................. 370/401 |
| 2009/0319674 A1* | 12/2009 | Yahyaoui et al. ............ 709/228 |
| 2009/0323632 A1* | 12/2009 | Nix .............................. 370/331 |
| 2010/0040211 A1 | 2/2010 | Maeng et al. |
| 2010/0284398 A1 | 11/2010 | Maeng et al. |
| 2011/0026701 A1* | 2/2011 | Kirchhoff et al. ........ 379/207.13 |

FOREIGN PATENT DOCUMENTS

| | | |
|---|---|---|
| JP | 2005-277681 | 10/2005 |
| JP | 2007-013684 | 1/2007 |
| JP | 2009-005075 | 1/2009 |

OTHER PUBLICATIONS

Japanese Office Action dated Aug. 17, 2015 issued in counterpart application No. 2013-550403, 7 pages.

* cited by examiner

METHOD AND APPARATUS FOR PHONE COMMUNICATION USING HOME NETWORK

PRIORITY

This application claims priority under 35 U.S.C. §119(a) to Patent Applications filed in the Korean Intellectual Property Office on Jan. 18, 2011 and May 9, 2011 and assigned Serial Nos. 10-2011-0005163 and 10-2011-0043690, respectively, the entire disclosure of each of which is incorporated herein by reference.

BACKGROUND OF THE INVENTION

1. Field of the Invention

The present invention relates generally to phone communication using a home network, and more particularly, to a method and an apparatus for authenticating a counterpart when phone communication is performed using the home network.

2. Description of the Related Art

Generally, the home network is realized with a private network based on the Internet Protocol (IP), and connects various types of devices, such as Personal Computers (PCs), intelligent products, and wireless devices used at home with one network through a common virtual computing environment called middleware and controls them.

The middleware enables communication between various digital devices through connecting the devices with a peer-to-peer scheme, and Home AV Interoperability (HAVI), Universal Plug and Play (UPnP), Java Intelligent Network Infrastructure (JINI), and Home Wide Web (HWW) have been suggested for the middleware.

Each device in a computing environment established through the UPnP middleware is allocated a protocol from a server according to Dynamic Host Configuration Protocol (DHCP) or an address selected by an automatic IP designation function and performs a communication between devices and a search on a network based on the allocated protocol or address.

A UPnP network is the most widely utilized home network technology and defines a UPnP device and a UPnP service based on a protocol between the UPnP device and the UPnP service. The UPnP network includes a Controlled Device (CD), which is a home network device connected to an IP-based home network and controlled, and a Control Point (CP), which is a device for controlling the CD. The control point is a device for controlling the controlled device and is an element for requesting an event and receiving the event. The controlled device is a device performing a determined function based on the request of the control point and is an element for transmitting an event to a control point requesting the event when a state of the controlled device is changed.

An operation between devices in the existing UPnP network includes an advertisement process, a discovery process, a description process, a control process, and an eventing process.

The advertisement process is a process of reporting a new controlled device to other devices on a home network when the new controlled device is connected to the home network. The discovery process is a process of searching for controlled devices operated on the home network when the new control point is connected to the home network, in order for the control point to control the controlled device. The description process is a process of parsing a service description eXtensible Markup Language (XML) file or a device description XML file through an IP address of a controlled device acquired in the discovery process and recognizing a function of a newly added device in more detail. The control process is a process of, transmitting a control message (action request) for requesting a predetermined service to a corresponding controlled device and receiving a response message (result, variable value) corresponding to the control message by using a Simple Object Access Protocol (SOAP) according to the UPnP device architecture, when the control point desires to provide a specific service through the controlled device. The eventing process is a process of identifying an information change state of the controlled device which has provided the predetermined service according to a control instruction transmitted from the control point.

FIG. 1 is a block diagram illustrating a UPnP telephony system.

The UPnP telephony system includes a telephony service provider 101, a UPnP telephony control point (the control point) 102, a telephony terminal 103, and an electronic device 104. The telephony terminal 103 and the electronic device 104 are located in a space in which a communication with the control point 102 can be performed by using a UPNP protocol.

The telephony service provider 101 provides a telephony service and provides the telephony terminal 103 with an interface for transmitting/receiving a call.

The UPnP telephony control point 102 is a logical software module for controlling a UPnP telephony server 106 and a UPnP telephony client 198 by using a UPnP action. The UPnP telephony control point 102 may be included in a device, such as a PC or a Personal Digital Assistant (PDA), independently of the telephony terminal and the electronic device 104, but may be included in a physical device, such as the telephony terminal 103 or the electronic device 104. When the UPnP telephony control point 102 is included in a physical device, such as the telephony terminal 103 or the electronic device 104, the UPnP telephony control point 102 may directly control the UPnP telephony server 106 or the UPnP telephony client 109 without using a UPnP action.

The UPnP telephony control point 102 determines media, a protocol, and a transmission format to be used in call transmission/reception by using information on a capability of a call data transmission agent included in the UPnP telephony server 106 or the UPnP telephony client 109. The UPnP telephony control point 102 then generates and transmits a profile including the determined media, protocol, and transmission format to the UPnP telephony server 106 or the UPnP telephony client 109, to set an environment of a call data transmission agent included in the telephony terminal 103 or the electronic device 104.

The telephony terminal 103 is a physical device, such as a PC including Voice over IP (VoIP) configured with a Computer Engineering (CE) device including a telephone or software and a mobile communication terminal connected via a communication network, and includes the UPnP telephony server 106 configured with software. Moreover, the telephony terminal 103 controls call transmission/reception with the telephony service provider 101 providing the telephony service by using an interface provided by the corresponding telephony service provider 101.

The electronic device 104 is a CE device, such as a video phone, capable of inputting and outputting voice or a video of a user, and may include a physical device, such as a PC or a television, and includes the UPnP telephony client 109 configured with software. Thus, an embodiment of the present invention may enable a user to conveniently transmit and receive a call by using a home network system.

FIG. 2 illustrates a situation in which users perform video calls by using the UPnP telephony technology in each of their respective homes, respectively. Bob and Alice make video call through mobile phones by using the CE devices, such as televisions, as video and voice input and output devices in their homes. The television includes a video input device, such as a camera, and a video input through the camera is transmitted through a mobile phone via a mobile communication network, e.g., Third Generation Mobile Telecommunications (3G)/Long Term Evolution (LTE) network. Alice's mobile phone receives and then transmits the video to the television and shows the video of Bob to Alice. The video of Alice is also transmitted to Bob's television in the same manner.

In FIG. 2, because the video transmitted to the mobile phone is retransmitted to the television, a resolution of the video is optimized to a size of a screen of the mobile phone. When a low-resolution video is enlarged and displayed in the television, the deterioration of video quality is inevitable.

FIG. 3 illustrates a method of transmitting a high-definition video in the above situation. Information on a television of a counterpart is exchanged and set by using a mobile phone and a high-definition video appropriate for the television is exchanged using a broadband network.

A configuration protocol of FIG. 3 may be specified in a scheme of controlling a mobile phone of a counterpart and receiving or controlling information on a network of the counterpart by using a message in a general scheme of REpresentational State Transfer (REST) using HyperText Transfer Protocol (HTTP).

However, when the configuration protocol of the home network telephony service is specified using the REST scheme, any person can easily find out an IP address of a REST server of the home network. The person can then arbitrarily access the REST server and make a request for and acquire network information on the home network and control a device connected to the home network by using the acquired network information.

Further, the aforementioned problems occur when Short Message Service (SMS) is used instead of a server in the REST scheme.

SUMMARY OF THE INVENTION

Accordingly, an aspect of the present invention is designed to solve the above-stated problems occurring in the prior art, and to provide at least the advantages described below. An aspect of the present invention is to provide a method and an apparatus for authenticating a device making a request for an access to a home network in a home network telephony service.

Another aspect of the present invention provides a method and an apparatus for preventing an unauthenticated device from accessing a home network.

Furthermore, the present invention provides a method and an apparatus for providing a legal user with network information only when another user makes a consent.

In accordance with an aspect of the present invention, a method of providing a home network telephony service, in which a first mobile communication terminal having a phone call connection with a second mobile communication terminal provides a phone communication service by using a first electronic device connected to a home network of the first mobile communication terminal is provided. The method includes transmitting a call initiation request message, including an address of the first electronic device, and making a request for a phone call connection using the first electronic device in response to the phone call to the second mobile communication terminal; receiving a response message in response to the call initiation request message from the second mobile communication terminal; and transmitting a call initiation request message including the address of the second electronic device and making a request to the first electronic device to originate a call to the second electronic device, when the response message includes information indicating that a call connection waiting is set and an address of a second electronic device connected to a home network of the second mobile communication terminal, wherein the call connection waiting is a waiting state for the phone call connection between the second electronic device and the first electronic device without permission of the second mobile communication terminal according to transmission of a call initiation request to the second electronic device by the first electronic device.

In accordance with another aspect of the present invention, a method of providing a home network telephony service, in which a first mobile communication terminal having a phone call connection with a second mobile communication terminal provides a phone communication service by using a first electronic device connected to a home network of the first mobile communication terminal is provided. The method includes receiving a call initiation request message including an address of a second electronic device connected to a home network of the second mobile communication terminal and making a request for a phone call connection using the second electronic device in response to the phone call from the second mobile communication terminal; identifying if a call connection waiting is set; transmitting a call connection waiting request message including the address of the second electronic device to the first electronic device, when the call connection waiting is set; and transmitting a response message including information indicating that the call connection waiting is set and an address of the first electronic device to the second mobile communication terminal, wherein the call connection waiting is a waiting state for the phone call connection between the first electronic device and the second electronic device without permission of the first mobile communication terminal according to transmission of a call initiation request to the first electronic device by the second electronic device.

In accordance with another aspect of the present invention, a method of providing a home network telephony service, in which a first mobile communication terminal having a phone call connection with a second mobile communication terminal switches the phone call to a first electronic device connected to a home network of the first mobile communication terminal to provide a phone communication service. The method includes transmitting a home network telephony service initialization message including first identification information on the first mobile communication terminal and a first authentication key used for authentication of the first mobile communication terminal to the second mobile communication terminal; receiving a response message including second identification information on the second mobile communication terminal, the first authentication key, and a second authentication key in response to the home network telephony service initialization message from the second mobile communication terminal; transmitting a request message including authentication information using the first authentication key and the second authentication key, an address of the first electronic device, and the first identification information and making a request for a phone call connection using the first electronic device in response to the phone call to the second mobile communication terminal; and connecting the phone call using the first electronic device.

In accordance with another aspect of the present invention, a method of providing a home network telephony service, in which a first mobile communication terminal having a phone call connection with a second mobile communication terminal switches the phone call to a first electronic device connected to a home network of the first mobile communication terminal to provide a phone communication service is provided. The method includes receiving a home network telephony service initialization message including second identification information on the second mobile communication terminal and a second authentication key from the second mobile communication terminal; transmitting a response message including first identification information on the first mobile communication terminal, a first authentication key, and the second authentication key and responding to the home network telephony service initialization message to the second mobile communication terminal; receiving a request message making a request for a phone call connection using a second electronic device connected to a home network of the second mobile communication terminal in response to the phone call and including authentication information using the first authentication key and the second authentication key, the second identification information, and an address of the second electronic device; performing an authentication, which identifies the second identification information included in the request message and identifies that the authentication information is included in the request message; and connecting a phone call using the first electronic device and the second electronic device, when the authentication is successfully performed.

In accordance with another aspect of the present invention, a system for providing a home network telephony service, in which a first mobile communication terminal having a phone call connection with a second mobile communication terminal provides a phone communication service by using a first electronic device connected to a home network of the first mobile communication terminal is provided. The system includes the first mobile communication terminal for transmitting a call initiation request message including an address of the first electronic device, and information on a type of phone communication data to be allocated to the first electronic device, and making a request for a phone call connection using the first electronic device in response to the phone call to the second mobile communication terminal, receiving a response message in response to the call initiation request message from the second mobile communication terminal, and transmitting a call initiation request message including the address of the second electronic device and making a request to the first electronic device to originate a call to the second electronic device, when the response message includes information indicating that a call connection waiting is set and an address of a second electronic device connected to a home network of the second mobile communication terminal; and the first electronic device for providing the address of the first electronic device according to a request of the first mobile communication terminal, and transmitting a call connection request message to the second electronic device to connect a call corresponding to the phone call when receiving the call initiation request message, wherein the call connection waiting is a waiting state for the phone call connection between the second electronic device and the first electronic device without permission of the second mobile communication terminal according to transmission of a call initiation request to the second electronic device by the first electronic device.

In accordance with another aspect of the present invention, a system for providing a home network telephony service, in which a first mobile communication terminal having a phone call connection with a second mobile communication terminal provides a phone communication service by using a first electronic device connected to a home network of the first mobile communication terminal is provided. The system includes the first mobile communication terminal for receiving a call initiation request message including an address of a second electronic device connected to a home network of the second mobile communication terminal and information on a type of phone communication data to be allocated to the second electronic device and making a request for a phone call connection using the second electronic device in response to the phone call from the second mobile communication terminal, identifying if a call connection waiting is set, transmitting a call connection waiting request message including the address of the second electronic device to the first electronic device when the call connection waiting is set, and transmitting a response message including information indicating that the call connection waiting is set and an address of the first electronic device to the second mobile communication terminal; and the first electronic device for providing the address of the first electronic device according to a request of the first mobile communication terminal, and setting the call connection waiting when receiving the call connection waiting request message, and connecting a phone call with the second electronic device without permission of the first mobile communication terminal when receiving a call connection request message from the second electronic device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
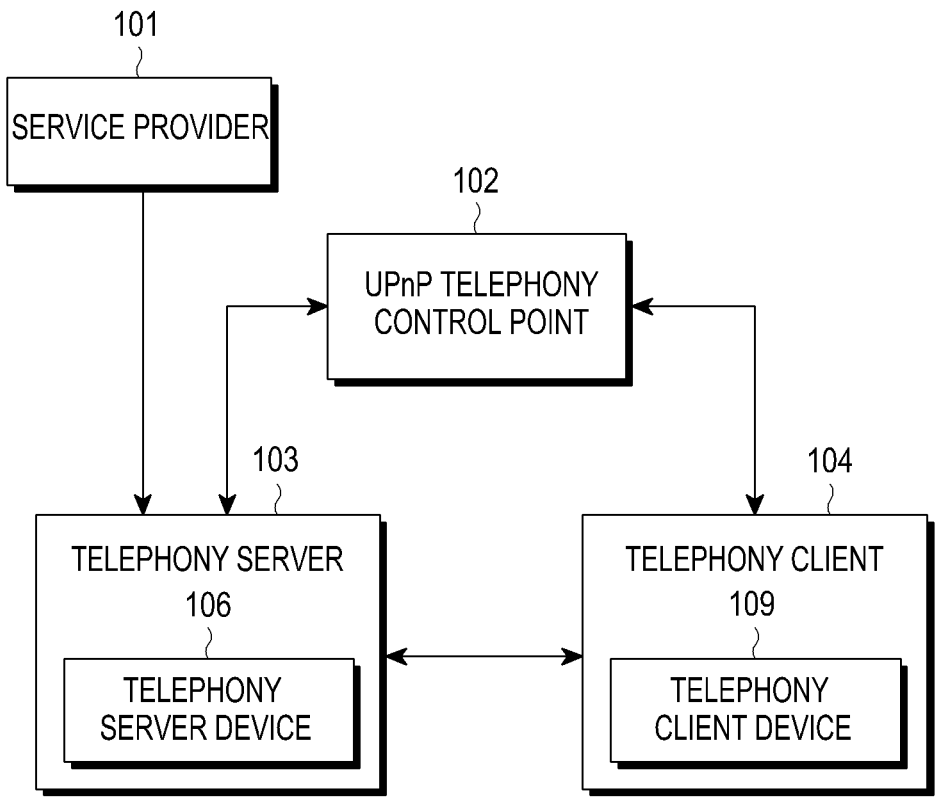
FIG. 1 is a block diagram illustrating a general UPnP telephony system.
Figure 2:
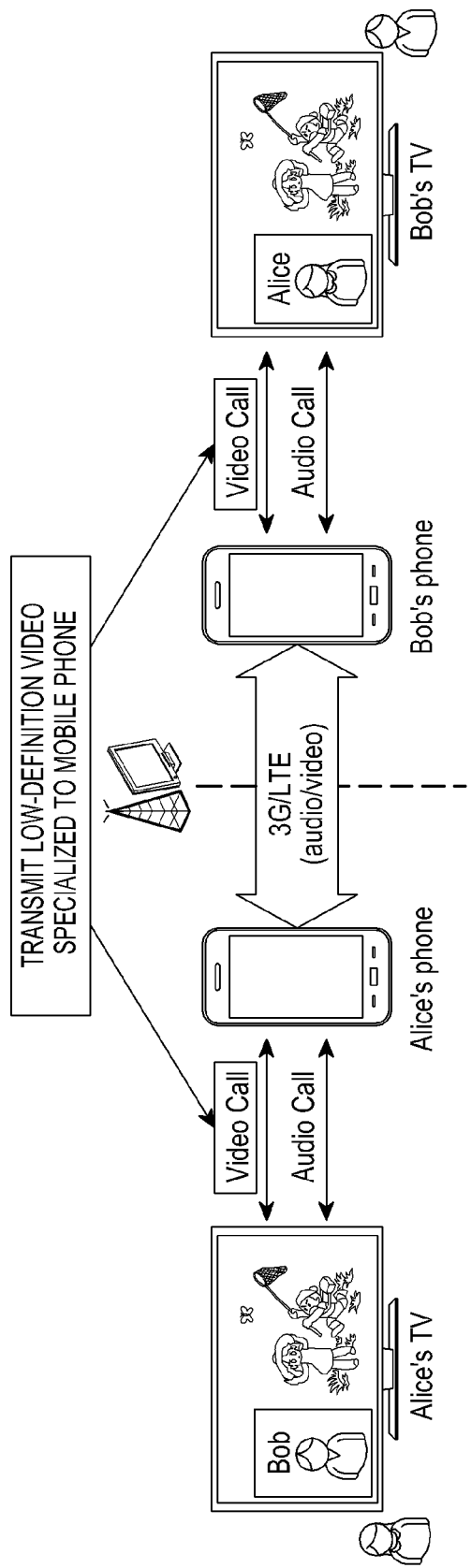
FIGS. 2 and 3 are diagrams illustrating a process of a phone call connection in a conventional UPnP telephony system.
Figure 3:
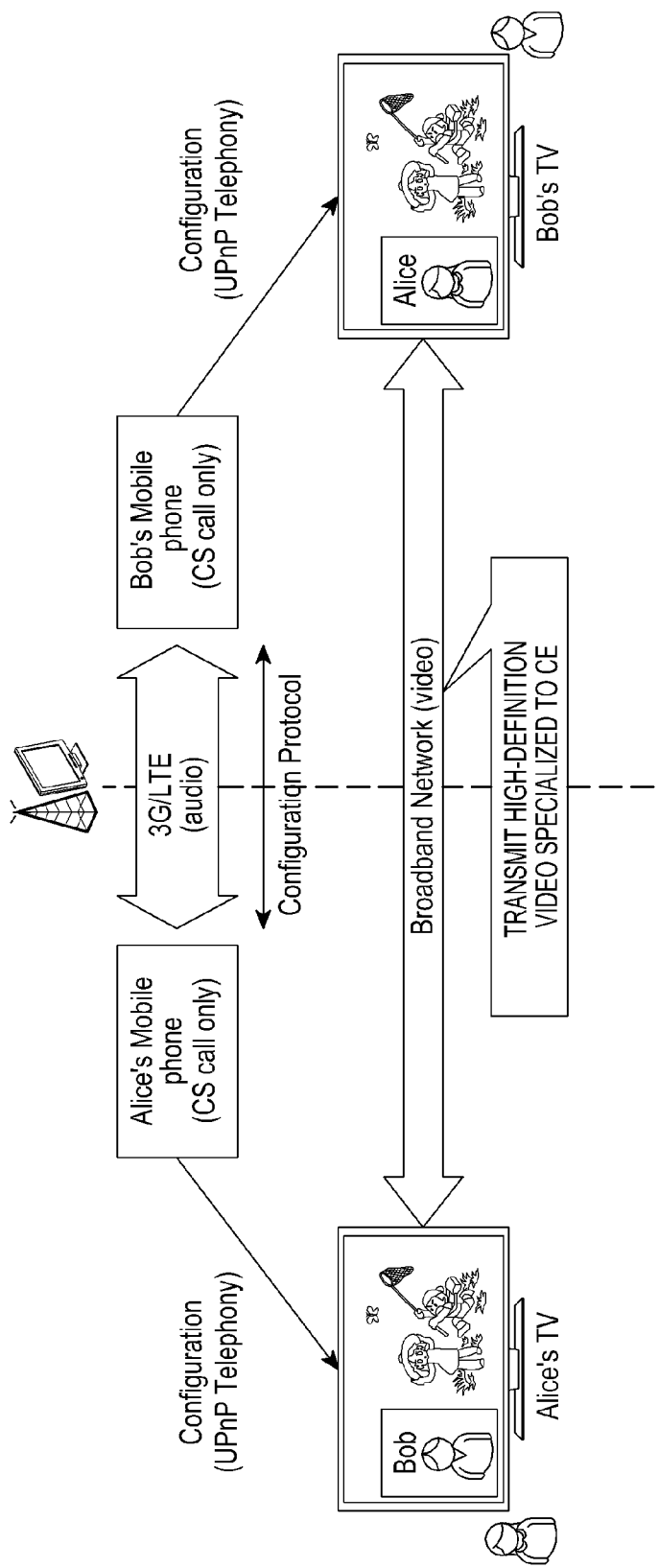

Hereinafter, various embodiments of the present invention will be described in detail with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention authenticates both-end telephony terminals and enhances a security of a home network when network information is provided to the both-end telephony terminals in order to switch a phone call to the home network in a home network telephony service in which a telephony terminal having the phone communication connection switches the phone call to electronic devices existing in the home network and providing the telephony service through the electronic device in the home network.

To this end, when the home network telephony service is started, an embodiment of the present invention exchanges authentication information on both-end telephony terminals or transmits authentication information to a phone communication counterpart together with home network information when the phone communication counterpart makes a request for the home network information or a response to the request of the home network information from the phone communication counterpart is made, the received authentication information is authenticated, and continues the service when the received authentication information is successfully authenticated. Identification information or authentication key of the telephony terminal may be used as the authentication information. The authentication information may be transmitted/received through a short text message or a REST message. Further, embodiments of the present invention may be applied to various middleware used in various home networks, but an embodiment of the present invention will be described based on an example of a home network using the UPnP.

Figure 4:
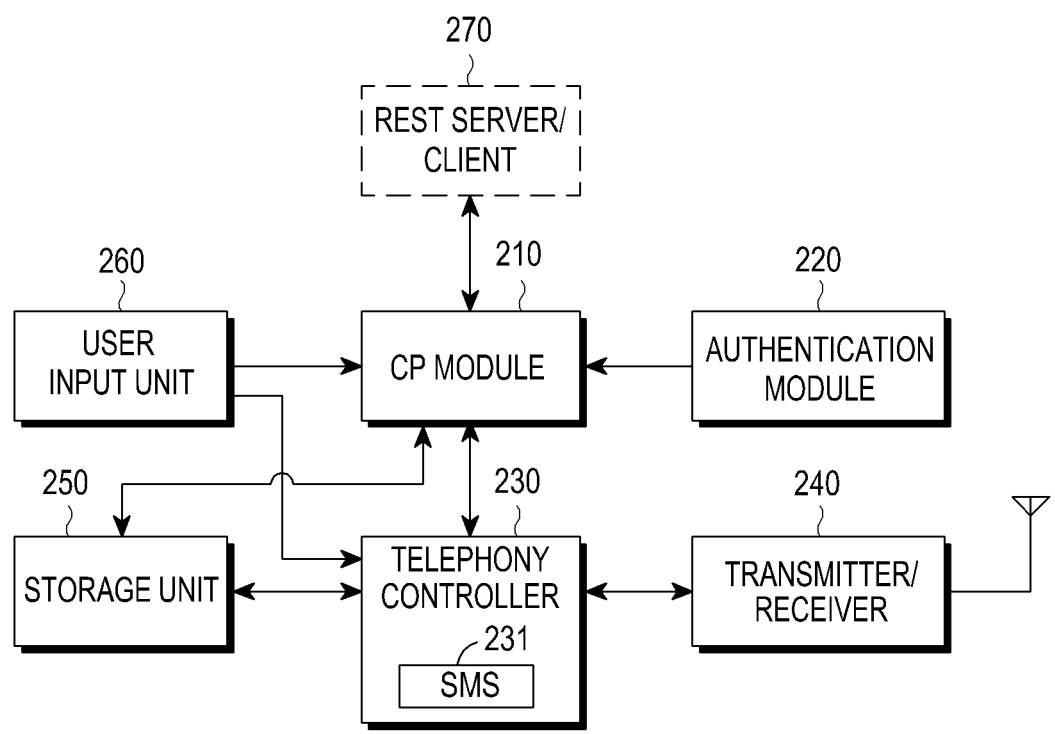
FIG. 4 is a block diagram illustrating a telephony terminal according to an embodiment of the present invention.

FIG. 4 illustrates an example of a telephony terminal according to an embodiment of the present invention. The telephony terminal is a physical device, such as a PC including VoIP configured with a CE device including a telephone or software and a mobile communication terminal connected via a communication network.

Referring to FIG. 4, the telephony terminal includes a CP 210, an authentication module 220, a telephony controller 230, a transmitter/receiver 240, a storage unit 250, a user input unit 260. Further, the telephony terminal may additionally include a REST server/client 270.

The telephony controller 203 controls an operation according to a telephony communication and performs an operation for providing the home network telephony service according to a control of the control point module 210. The telephony controller 230 may perform at least one communication call among a mobile communication, wired phone communication, and VoIP. The telephony controller 230 according to the embodiment of the present invention may also include an SMS transmission/reception module 231.

The transmitter/receiver 240 transmits and receives messages or data to and from a network or other devices, transfers the received message or data to the telephony controller 231, and transmits a message or data input in the telephony controller 231. The transmitter/receiver 240 supports the mobile communication or IP communication.

The storage unit 250 stores a program for processing and controlling the telephony terminal, reference data, various renewable storage data, and the like, and provides the stored program and data to a working memory of the telephony controller 231 and the control point module 210. The storage unit 250 may store various home network information. For example, the home network information includes a list of home network devices, an address of a home network device, and detailed information on a home network device.

The user input unit 260 is a device for providing an input interface between a user and the telephone terminal, and includes, for example, a keypad and a touch screen. Further, the user input unit 260 may include a microphone or a camera.

The control point module 210 is a software module for controlling a telephony server and a telephony client by using UPnP. The telephony control point module 210 may be included in another device, separated from the telephony terminal, but it is assumed that the telephony control point module 210 is included in the telephony terminal in the embodiment of the present invention.

The control point module 210 decides on media, a protocol, and a transmission format to be used in call transmission and reception using information on a capability of a call data transmission agent included in the telephony controller 230. The control point module 210 generates a profile in which the decided media, protocol, and transmission format are defined and transmits the generated profile to a home network device including a UPnP telephony client or a UPnP telephony server, to set an environment of the call data transmission agent included in the telephony terminal or the home network device. The home network device including the UPnP telephony client or the UPnP telephony server includes, for example, a television and a PC.

The control point module 210 controls operations of various elements included in the telephony terminal in order to provide the home network telephony service according to the present invention. That is, the control point module 210 controls the REST server/client 270 or the telephony controller 230 to generate various messages for providing the home network telephony service and transmit the generated messages through the transmitter/receiver 240. The control point module 210 ensures makes the various messages received through the transmitter/receiver 240 are processed in relevant elements. Moreover, the control point module 210 controls the authentication module 220 to perform a process of generating and authenticating an authentication key.

The authentication module 220 generates an authentication key under a control of the control point module 210 and authenticates an authentication key transferred from another device. According to an embodiment of the present invention, the authentication key may use random numbers.

The REST server/client 270 is a type of an IP-based server/client which can be included in the telephony terminal for support of the home network telephony service, and generates and processes various messages necessary for providing the home network telephony service under a control of the control point module 210. In another embodiment of the present invention, the REST server/client 270 may be substituted with another type of IP-based server/client.

The telephony terminal may be implemented in various devices such as a mobile communication terminal, a PC, and a PDA, but it is assumed that the telephony terminal is a mobile communication terminal in the embodiment below. Accordingly, the mobile communication terminal described in the following embodiment is similar to the telephony terminal.

Figure 5:
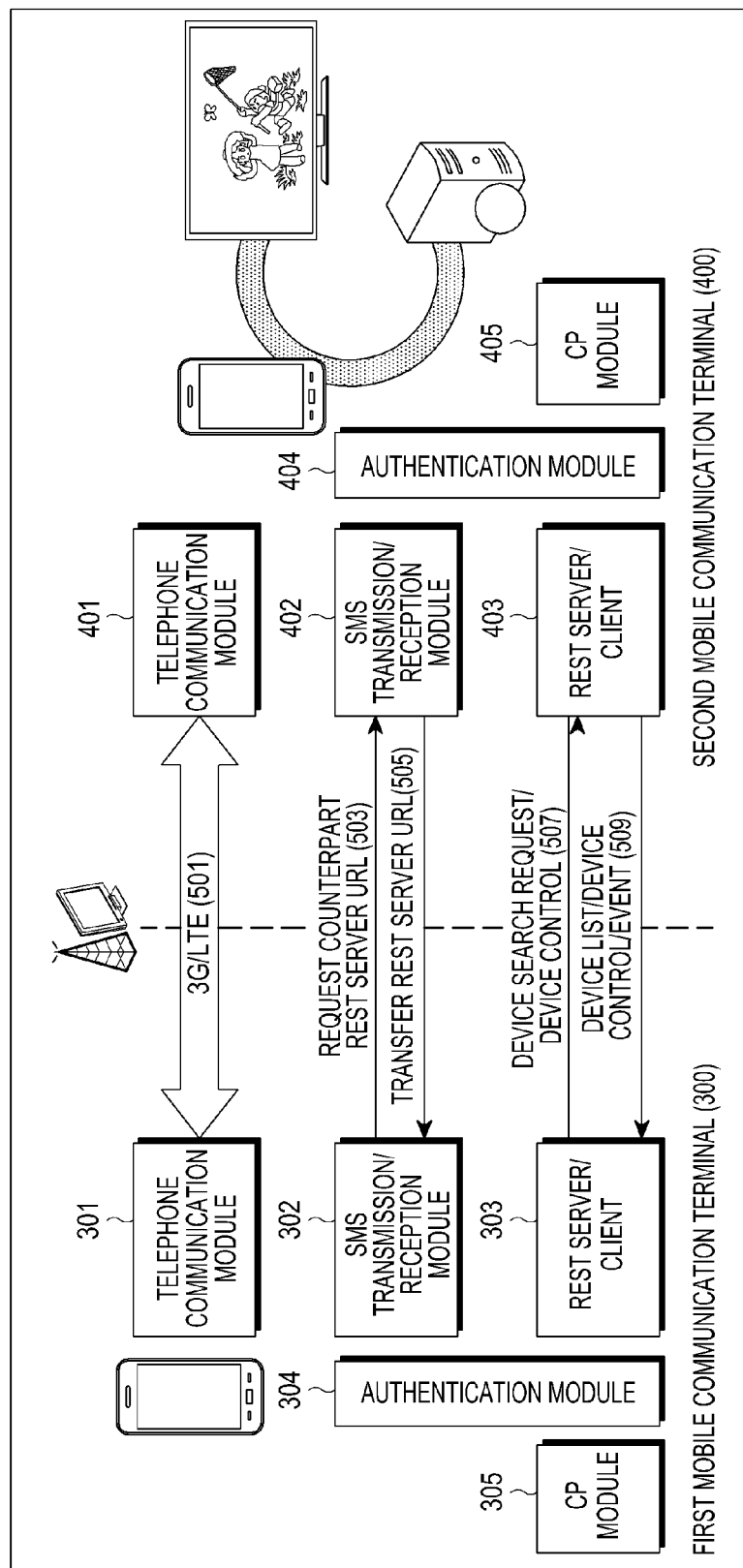
FIG. 5 is a block diagram illustrating a UPnP telephony system according to an embodiment of the present invention.

FIG. 5 is a block diagram illustrating a UPnP telephony system according to an embodiment of the present invention. In FIG. 5, it is assumed that identification information on each communication terminal is used as the authentication information and information on a network device is transmitted/received using a REST message.

Referring to FIG. 5, mobile communication terminals 300 and 400 used by a user include REST servers 303 and 403, which is a type of HTTP server, as well as modules 302 and 402 capable of transmitting/receiving a short message of a counterpart. Authentication modules 304 and 404 within the mobile communication terminals 300 and 400 serve to authenticate whether control signals or devices transferred through the short message or the REST message are transmitted to an authenticated transmission device. Phone communication modules 301 and 401 and SMS transmission/reception modules 302 and 402 correspond to the telephony controller 230 of the telephony terminal illustrated in FIG. 4.

That is, in a state in which a phone call for mobile communication between the first mobile communication terminal 300 and the second mobile communication terminal 400 is connected (step 501), when the first mobile communication terminal 300 would like to switch a phone call to the home network telephony service, the control point module 305 must acquire network information on a home network having a phone call connection with the second mobile communication terminal 400.

Accordingly, in step 503, the control point module 305 transmits an address request message for the REST server to the second mobile communication terminal 400 by using the SMS transmission/reception module 302. The address request message corresponds to a type of an initiation message of the home network telephony service, and includes identification information, e.g., a telephone number, on the first mobile communication terminal 300.

When the second mobile communication terminal 400 receives the address request message, the second mobile communication terminal 400 determines whether the identification information, i.e., the telephone number, included in the address request message for the REST server is identical to a telephone number of the first mobile communication terminal 300 having a phone call connection in step 501 through the authentication module 404 under the control of the control point module 405. The second mobile communication terminal 400 is aware of the telephone number of the first mobile communication terminal 300 in advance according to the connection of the phone call. As a result of the identification, when the identification information, i.e., the telephone number, is identical to the telephone number of the first mobile communication terminal 300, the control point module 405 configures an address response message including a Uniform Resource Identifier (URI) address of the REST server and transmits the configured address response message by using the SMS transmission/reception module 402 to the first mobile communication terminal 300 in step 505. The address response message includes identification information, e.g., a telephone number, on the second mobile communication terminal 400.

When the first mobile communication terminal 300 receives the address response message in step 505, the first mobile communication terminal 300 determines whether the identification information, i.e., the telephone number, included in the address response message is identical to the telephone number of the second mobile communication terminal 400 having the phone communication connection in step 501 through the authentication module 304 under the control of the control point module 305. When the identification information, i.e., the telephone number, included in the address response message is identical to the telephone number of the second mobile communication terminal 400, the first mobile communication terminal 300 processes the address response message as an effective message.

The control point module 305 of the first mobile communication terminal 300 then controls the REST server/client 303, configures a device search request/device control message for the device connected to the home network, and transmits the device search request/device control message to the second mobile communication terminal 400 in step 507. The device search request/device control message includes the telephone number of the second mobile communication terminal 400.

When the second mobile communication terminal 400 receives the device search request/device control message, the second mobile communication terminal 400 determines whether the telephone number included in device search request/device control message is identical to the telephone number of the first mobile communication terminal 300 having the phone communication connection in step 501 through the authentication module 404 under the control of the control point module 405. As a result of the identification, when the telephone number included in device search request/device control message is identical to the telephone number of the first mobile communication terminal 300, the control point module 405 configures a response message including a device list/device control/event by using the REST server/client 403 and transmits the configured response message to the first mobile communication terminal 300 in step 509. The response message includes the telephone number of the second mobile communication terminal 400.

When the first mobile communication terminal 300 receives the response message in step 509, the first mobile communication terminal 300 determines whether the telephone number included in the response message is identical to the telephone number of the second mobile communication terminal 400 having the phone communication connection in step 501 through the authentication module 304 under the control of the control point module 305. When the telephone number included in the response message is identical to the telephone number of the second mobile communication terminal 400, the first mobile communication terminal 300 processes the response message as an effective message.

Figure 6:
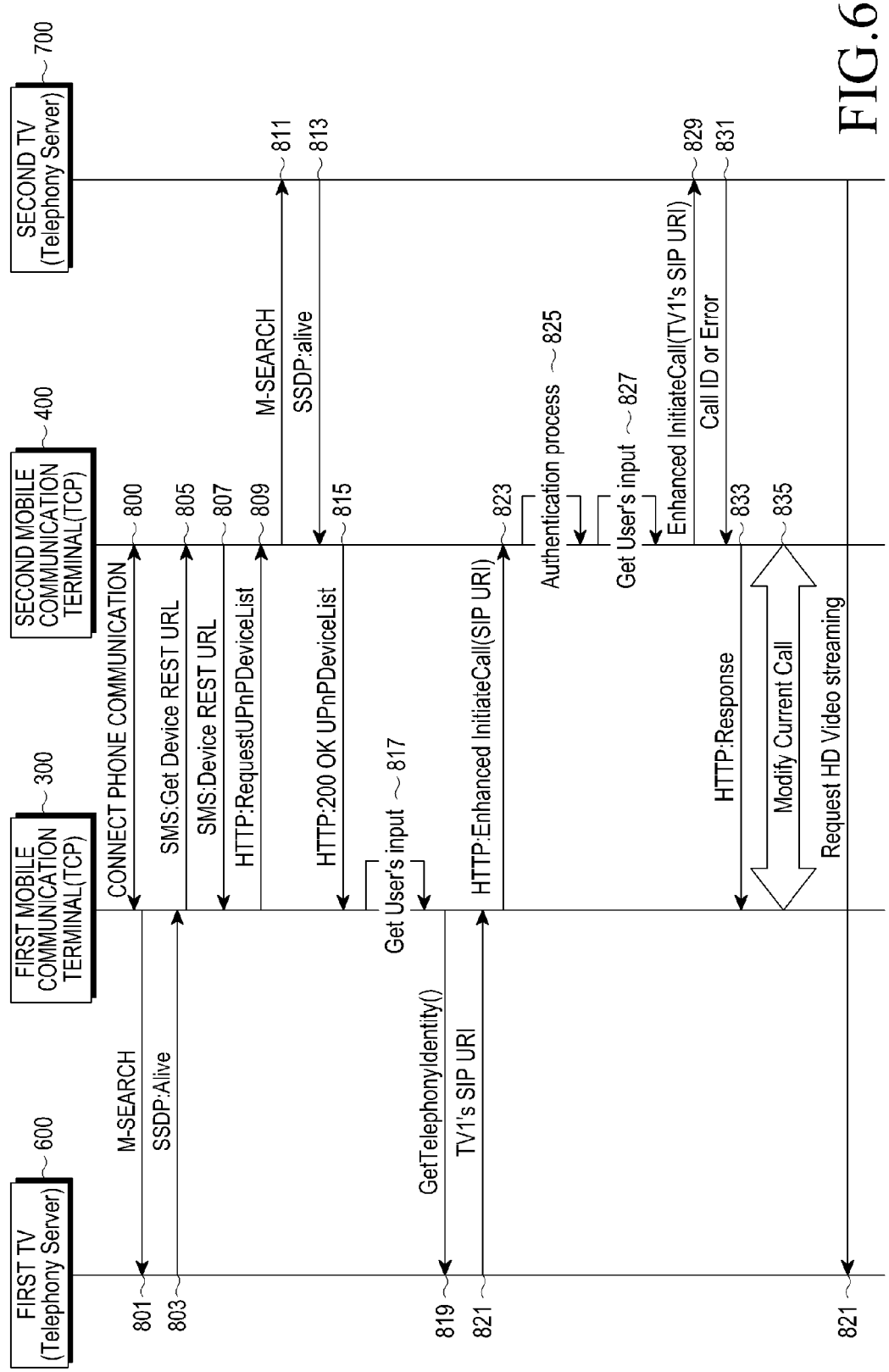
FIG. 6 is a flowchart illustrating a process of providing a UPnP telephony service according to an embodiment of the present invention.

FIG. 6 is a flowchart illustrating a process of providing a UPnP telephony service according to an embodiment of the present invention of FIG. 5 in detail. FIG. 6 illustrates an operation of the present invention, in which an IP address of the REST server is initially exchanged through a short message and then information related to the UPnP telephony of a counterpart home network is exchanged by using the REST message thereafter. Further, the operation includes a step of authenticating a request message when the REST server receives a request for information. The processes illustrated in FIG. 6 will be described below.

When the first mobile communication terminal 300 is in a telephone call connection state with the second mobile communication terminal 400 in step 800, the first mobile communication terminal 300 searches for a telephony device of the home network to which the first mobile communication terminal 300 currently belongs by using the included control point module 305 in steps 801 and 803. The telephony device may be a first television 600.

The first mobile communication terminal 300 makes a request for an IP address of the REST server of the second mobile communication terminal 400 by using the short message in step 805. The first mobile communication terminal 300 may get the IP address of a counterpart by using a Network Address Book (NAB) service, without using the short message. An address request message includes the telephone number of the first mobile communication terminal 300.

The second mobile communication terminal 400 determines whether the telephone number included in the address request message for the REST server is identical to the telephone number of the first mobile communication terminal 300 having the phone communication connection in step 800 through the authentication module 404 under the control of the control point module 405. When the telephone number included in the address request message for the REST server is not identical to the telephone number of the first mobile communication terminal 300, the second mobile communication terminal 400 either ignores the address request message or transmits an error message.

When the telephone number included in the address request message for the REST server is identical to the telephone number of the first mobile communication terminal 300, the second mobile communication terminal 400 transfers the IP address of the REST server 403 of the second mobile communication terminal 400 to the first mobile communication terminal 300 by using the short message. An address response message including the IP address includes the telephone number of the second mobile communication terminal 400.

When the first mobile communication terminal 300 receives the address response message, the first mobile communication terminal 300 determines whether the telephone number included in the address response message is identical to the telephone number of the second mobile communication terminal 400 having the phone communication connection in step 800 through the authentication module 304 under the control of the control point module 305. When the telephone number included in the address response message is identical to the telephone number of the second mobile communication terminal 400, the first mobile communication terminal 300 processes the address response message as an effective message. However, when the telephone number included in the address response message is not identical to the telephone number of the second mobile communication terminal 400, the first mobile communication terminal 300 either ignores the address request message or transmits an error message.

When the telephone number included in the address response message is identical to the telephone number of the second mobile communication terminal 400 as a result of the identification, the first mobile communication terminal 300 makes a request for information on the UPnP device list of the counterpart home network to the second mobile communication terminal 400 by using the REST message in step 809. A home network device list request message includes the telephone number of the first mobile communication terminal 300.

The first mobile communication terminal 300 adds the IP address of the REST server 403 of the second mobile communication terminal 400 to an address book of the first mobile communication terminal 300 so that it does not again transmit the short message in the future. When the IP address of the REST server 403 is changed, the second mobile communication terminal 400 transmits the error message serving as the response to step 809 and transfers the IP address by using the short message again.

The second mobile communication terminal 400 receiving the request for the information on the UPnP device list of the home network in step 809 authenticates the first mobile communication terminal 300 by using the telephone number included in the home network device list request message.

When the second mobile communication terminal 400 successfully authenticates the first mobile communication terminal 300, the second mobile communication terminal 400 searches for a UPnP device within the home network by using an M-SEARCH message according to a scheme defined in the UPnP Telephony DA 1.1 in steps 811 and 813. The found device connected to the home network may be, for example, a second television 700. The second mobile communication terminal 400 then transfers information on the home network device to the first mobile communication terminal 300 in step 815. The home network device list response message including the list of the home network devices includes the telephone number of the second mobile communication terminal 400.

The processes up to step 809 are preparatory processes for connection of the high-definition home network telephony service, and the processes after step 809 are operated after a user actually controls the device for the high-definition home network telephony service.

In step 815, the first mobile communication terminal 300 receiving the home network device list authenticates the second mobile communication terminal 400 by using the telephone number included in the home network device list response message and determines if the home network device list response message is effective. When it is determined that the home network device list response message is effective, the first mobile communication terminal 300 selects the home network device, i.e., the first television 600 for providing the home network telephony service according to the selection of the user in step 817. The first mobile communication terminal 300 then acquires an SIP URI address of the first television 600 in steps 819 and 821.

The first mobile communication terminal 300 transfers the SIP URI address of the first television 600 to the second mobile communication terminal 400 by using the REST message for performing the home network telephony service in step 823. A call initiation request message including the SIP URI address of the first television 600 is a message requesting a call switch according to the provision of the home network telephony service. The call initiation request message includes the telephone number of the first mobile communication terminal 300.

The second mobile communication terminal 400 receiving the call initiation request message in step 823 determines whether the call initiation request message is transferred from an appropriate user in step 825. That is, the second mobile communication terminal 400 determines whether the telephone number included in the call initiation request message is identical to the telephone number of the first mobile communication terminal 300 having the phone communication connection in step 800.

As a result of the authentication, when the second mobile communication terminal 400 determines that the call initiation request message is appropriate, the second mobile communication terminal 400 selects a device, e.g., the second television 700, to perform the home network telephony service according to an input of the user in step 827. The second mobile communication terminal 400 then generates the call initiation request message, i.e., EnhancedInitiatecall (TVI's SIP URI), for the initiation of the home network telephony service and transfers the address of the first television 600 to the second television 700 in step 829.

The second television 700 transfers a response indicating whether the call initiation request message received in step 829 is normally processed to the second mobile communication terminal 400 in step 831. The second mobile communication terminal 400 configures a response indicating whether the received call initiation request message is normally processed in response to the request made in step 823 according to the contents of the response in step 831 and transfers the configured response to the first mobile communication terminal 300 in step 833.

In step 835, the first mobile communication terminal 300 and the second mobile communication terminal 400 modify the phone call. For example, the phone call is set such that a voice communication is maintained through the first mobile communication terminal 300 and the second mobile communication terminal 400 and video according to the phone communication is transmitted and received through the first television 600 and the second television 700 in step 837. The first television 600 and the second television 700 are connected through the home network and a backbone network connected to the home network. The voice communication and the video communication are processed with one session.

In the embodiment, an example of the case in which the short message is used along with the REST message has been described. However, steps 809, 815, 823, and 833 may be performed through the short message according to another embodiment of the present invention. The short message transmitted to the second mobile communication terminal 400 in step 805 may include information indicating an initialization message for the home network telephony service and the telephone number of the first mobile communication terminal 300 instead of information making the request of the address of the REST server. Moreover, the short message transmitted to the first mobile communication terminal 300 in step 807 may include content of the response to the initialization message and the telephone number of the second mobile communication terminal 400. Even if the message used in steps 809, 815, 823, and 833 is the short message, content included in the corresponding message may be the same as the aforementioned content.

A process of providing the home network telephony service according to different embodiments of the present invention will be described with reference to FIGS. 7 to 10. It is assumed that an additional authentication key, in addition to identification information of a corresponding mobile communication terminal, is used as authentication information in the second embodiment of the present invention.

Figure 7:
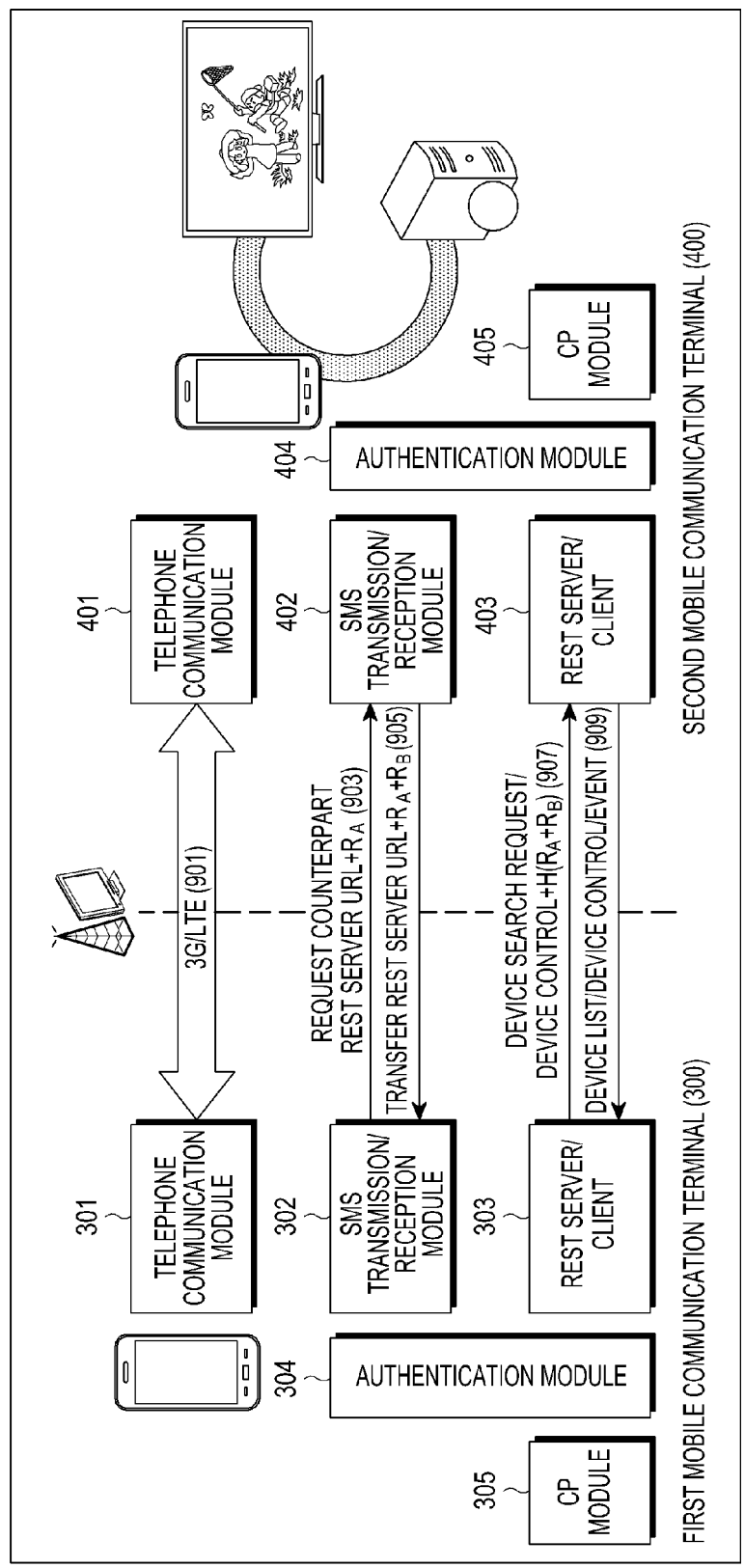
FIGS. 7 and 8 are block diagrams illustrating a UPnP telephony system according to an embodiment of the present invention.

FIG. 7 illustrates the mobile communication terminals 300 and 400 including not only the SMS transmission/reception modules 302 and 402 capable of transmitting/receiving the short message, but also the REST servers/clients 303 and 403 which are the type of HTTP server according to the second embodiment of the present invention.

The authentication modules 304 and 404 in the mobile communication terminals 300 and 400 authenticate whether control signals or devices transferred through the short message or the REST message are transmitted to an authenticated transmission device. The phone communication modules 301 and 401 and the SMS transmission/reception modules 302 and 402 correspond to the telephony controller 230 of the telephony terminal illustrated in FIG. 4.

Figure 9:
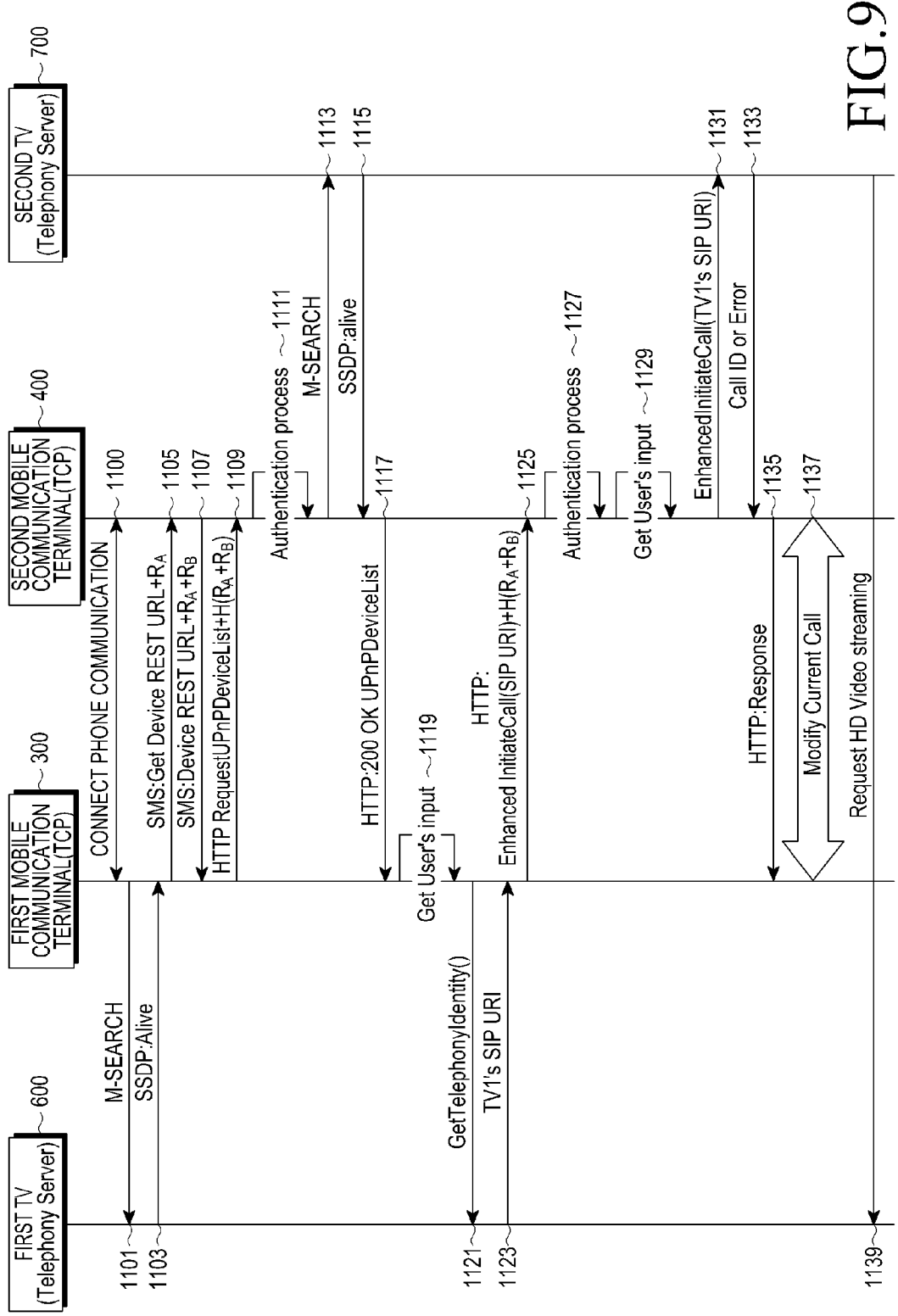
FIGS. 9 and 10 are flowcharts illustrating a process of providing a UPnP telephony service according to an embodiment of the present invention.

FIG. 9 illustrates a process of the home network telephony service in the system of FIG. 7 in detail.

Figure 8:
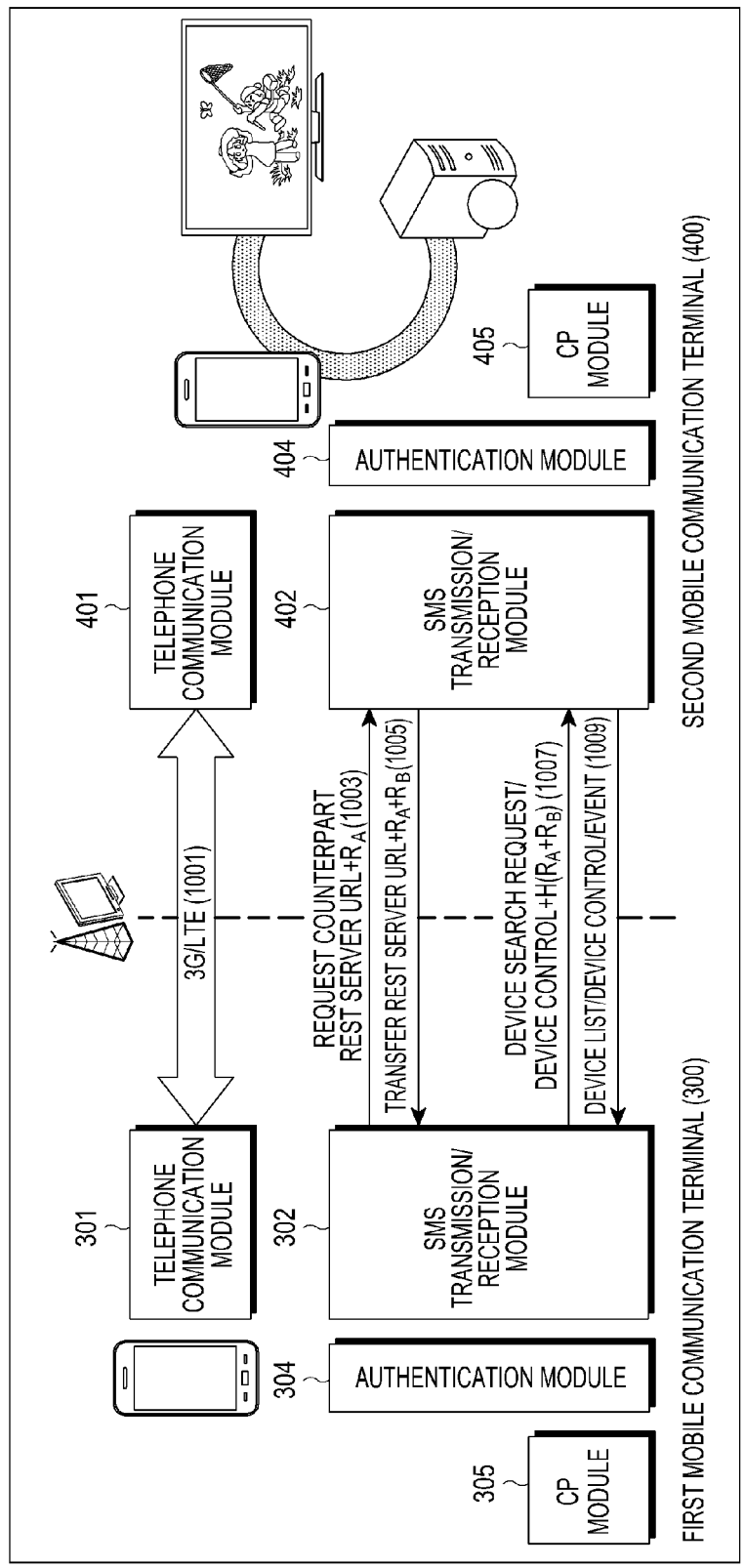
Figure 10:
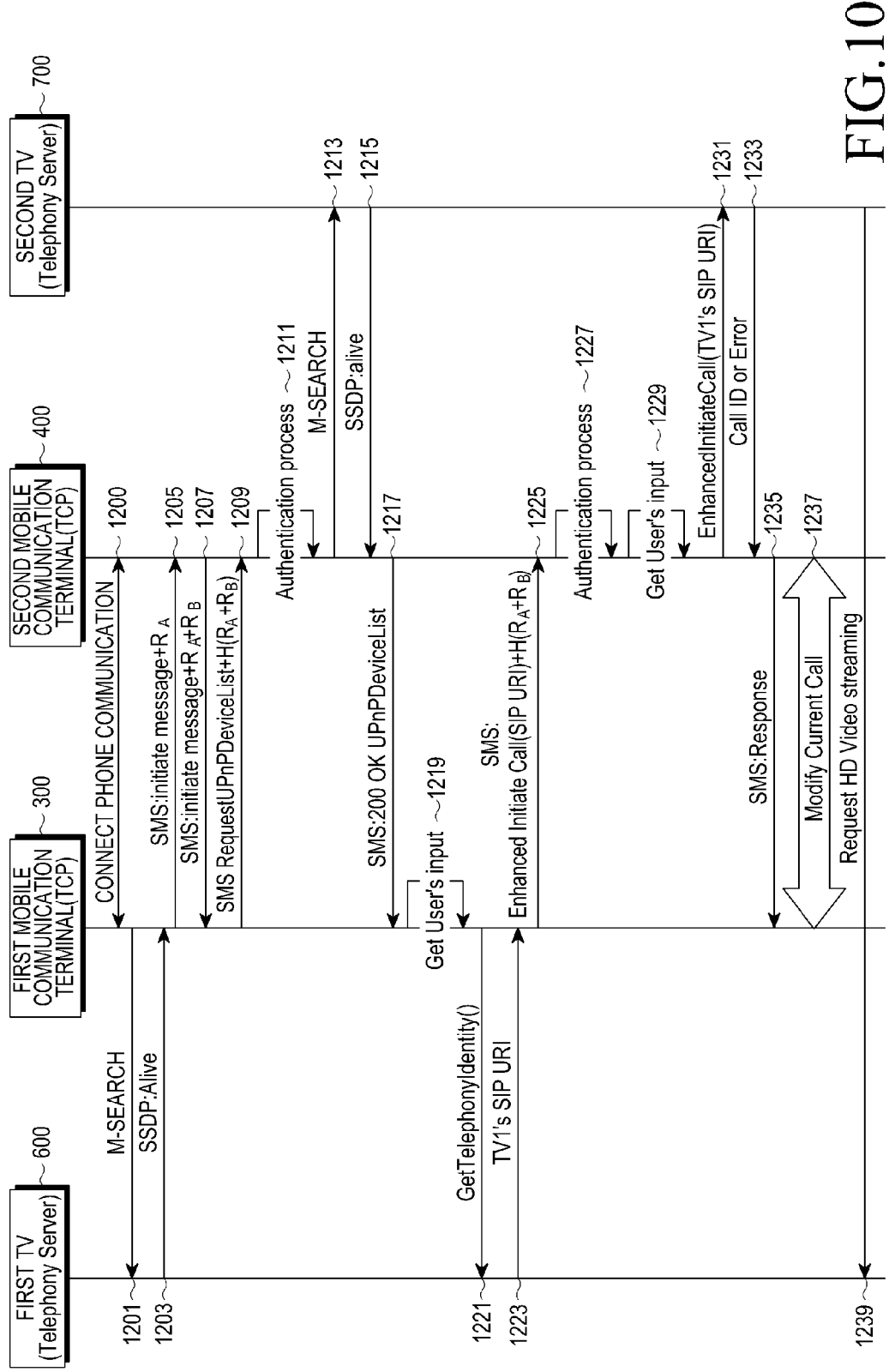

FIGS. 8 and 10 illustrate a setting process for providing the home network telephony service through the short message transmission/reception modules 302 and 402 capable of transmitting and receiving the short message by the mobile communication terminals 300 and 400 of the users according to the second embodiment of the present invention.

Referring to FIG. 7, when the first mobile communication terminal 300 is in a telephone call connection state with the second mobile communication terminal 400 for the mobile communication in step 901, the first mobile communication terminal 300 desires to switch a phone call to the home network telephony service, the control point module 305 must acquire network information on the home network connected with the second mobile communication terminal 400.

Accordingly, in step 903, the control point module 305 transmits an address request message for the REST server to the second mobile communication terminal 400 by using the SMS transmission/reception module 302. The address request message corresponds to a type of an initiation message of the home network telephony service, and includes identification information, e.g., a telephone number and an authentication key $R_A$, on the first mobile communication terminal 300. The authentication key $R_A$ may be random numbers and is generated by the authentication module 304.

When the second mobile communication terminal 400 receives the address request message, the second mobile communication terminal 400 determines whether the identification information, i.e., the telephone number, included in the address request message for the REST server is identical to a telephone number of the first mobile communication terminal 300 having the phone communication connection in step 901 through the authentication module 404 under the control of the control point module 405. The second mobile communication terminal 400 has been aware of the telephone number of the first mobile communication terminal 300 in advance according to the connection of the phone call. As a result of the identification, when the identification information, i.e., the telephone number, is identical to the telephone number of the first mobile communication terminal 300, the control point module 405 generates an authentication key $R_B$ through the authentication module 403. The authentication key $R_B$ may be random numbers.

The control point module 405 configures an address response message including a URI address of the REST server and identification information of the second mobile communication terminal 400, e.g., a telephone number, the authentication key $R_A$, and the authentication key $R_B$, and transmits the configured address response message by using the SMS transmission/reception module 402 to the first mobile communication terminal 300 in step 905.

When the first mobile communication terminal 300 receives the address response message in step 905, the first mobile communication terminal 300 determines whether the telephone number included in the address response message is identical to the telephone number of the second mobile communication terminal 400 having the phone communication connection in step 901 through the authentication module 304 under the control of the control point module 305. Moreover, the first mobile communication terminal 300 determines whether the authentication key $R_A$ generated in step 903 is included in the address response message. As a result of the identification, when the telephone number included in the address response message is identical to the telephone number of the second mobile communication terminal 400 and the authentication key $R_A$ generated in step 903 is included in the address response message, the first mobile communication terminal 300 processes the address response message as the effective message.

The control point module 305 of the first mobile communication terminal 300 then controls the REST server/client 303, configures a device search request/device control message for the device connected to the home network, and transmits the device search request/device control message to the second mobile communication terminal 400 in step 907. The device search request/device control message includes the telephone number of the first mobile communication terminal 300 and hash values of the authentication key $R_A$ and the authentication key $R_B$ shared through the steps 903 and 905.

When the second mobile communication terminal 400 receives the device search request/device control message, the second mobile communication terminal 400 authenticates the first mobile communication terminal 300 by using the telephone number included in a device search request/device control message and the hash values of the authentication key $R_A$ and the authentication key $R_B$ through the authentication module 404 under the control of the control point module 405. When the second mobile communication terminal 400 successfully authenticates the first mobile communication terminal 300, the control point module 405 configures a response message including a device list/device control/event by using the REST server/client 403 and transmits the configured response message to the first mobile communication terminal 300 in step 909. The response message includes the telephone number of the second mobile communication terminal 400 and the hash values of the authentication key $R_A$ and the authentication key $R_B$.

When the first mobile communication terminal 300 receives the response message in step 909, the first mobile communication terminal 300 authenticates the second mobile communication terminal 400 by using the telephone number and the hash values of the authentication key $R_A$ and the authentication key $R_B$ included in the response message through the authentication module 304 under the control of the control point module 305. When the first mobile communication terminal 300 successfully authenticates the second mobile communication terminal 400, the first mobile communication terminal 300 processes the response message as an effective message.

FIG. 9 illustrates a process for providing the UPnP telephony service according to an second embodiment of the present invention, as illustrated in FIG. 7, in detail. FIG. 9 illustrates an operation of the present invention in which an IP address of the REST server is initially exchanged through a short message and then information related to the UPnP telephony of a counterpart home network is exchanged by using the REST message thereafter. Further, the operation includes a step of authenticating a received request message when the REST server receives a request for information. The processes illustrated in FIG. 9 will be described below.

When the first mobile communication terminal 300 is in a telephone call connection state with the second mobile communication terminal 400 in step 1100, the first mobile communication terminal 300 searches for a telephony device of the home network to which the first mobile communication terminal 300 currently belongs by using the included control point module 305 in steps 1101 and 1103. The telephony device may be the first television 600.

The first mobile communication terminal 300 makes a request for an IP address of the REST server of the second mobile communication terminal 400 by using the short message in step 1105. The first mobile communication terminal 300 may get the IP address of a counterpart by using a Network Address Book (NAB) service, without using the short message. An address request message includes the telephone number and the authentication key $R_A$ of the first mobile communication terminal 300.

The second mobile communication terminal 400 determines whether the telephone number included in the address request message for the REST server is identical to the telephone number of the first mobile communication terminal 300 having the phone communication connection in step 1100 through the authentication module 404 under the control of the control point module 405. When the telephone number included in the address request message for the REST server is not identical to the telephone number of the first mobile communication terminal 300, the second mobile communication terminal 400 ignores the address request message or transmits an error message.

When the telephone number included in the address request message for the REST server is identical to the telephone number of the first mobile communication terminal 300, the second mobile communication terminal 400 generates the authentication key $R_B$ through the REST server 403. The authentication key $R_B$ may be random numbers. The second mobile communication terminal 400 configures an address response message including a URI address of the REST server and the identification information, e.g., the telephone number, the authentication key $R_A$, and the authentication key $R_B$, of the second mobile communication 400 and transmits the configured address response message to the first mobile communication terminal 300 by using the SMS transmission/reception module 402 in step 1107.

When the first mobile communication terminal 300 receives the address response message, the first mobile communication terminal 300 determines whether the telephone number included in the address response message is identical to the telephone number of the second mobile communication terminal 400 in the phone communication connection in step 1100 through the authentication module 304 under the control of the control point module 305. Further, the first mobile communication terminal 300 determines whether the authentication key $R_A$ generated in step 1105 is included in the address response message. As a result of the identification, when the telephone number included in the address response message is identical to the telephone number of the second mobile communication terminal 400 and the authentication key $R_A$ generated in step 1105 is included in the address response message, the first mobile communication terminal 300 processes the address response message as an effective message. However, when the telephone number included in the address response message is not identical to the telephone number of the second mobile communication terminal 400, the first mobile communication terminal 300 either ignores the address request message or transmits an error message.

The first mobile communication terminal 300 adds the IP address of the REST server 403 of the second mobile communication terminal 400 to an address book of the first mobile communication terminal 300 so that it does not transmit the short message in the future again. When the IP address of the REST server 403 is changed, the second mobile communication terminal 400 transmits the error message serving as the response to step 1109 and transfers the IP address by using the short message again.

As a result of the identification, when the telephone number included in the address response message is identical to the telephone number of the second mobile communication terminal 400, the first mobile communication terminal 300 makes a request for information on the UPnP device list of a counterpart home network to the second mobile communication terminal 400 in step 1109 by using the REST message. A home network device list request message includes the telephone number of the second mobile communication terminal 400 and the hash values of the authentication key $R_A$ and the authentication key $R_B$ shared through steps 1105 and 1107.

The second mobile communication terminal 400 receiving the home network device list request message in step 1109 authenticates the first mobile communication terminal 300 by using the telephone number included in the home network device list request message and the hash values of the authentication key $R_A$ and the authentication key $R_B$ in step 1111. That is, the second mobile communication terminal 400 determines whether the telephone number included in the home network device list request message is identical to the telephone number of the first mobile communication terminal 300 and identifies the authentication key $R_A$ and the authentication key $R_B$ from the hash values of the authentication key $R_A$ and the authentication key $R_B$.

When the second mobile communication terminal 400 successfully authenticates the first mobile communication terminal 300, the second mobile communication terminal 400 searches for a UPnP device within the home network by using an M-SEARCH message according to a scheme defined in the UPnP Telephony DA 1.1 in steps 1113 and 1115. The found device connected to the home network may be a second television 700. The second mobile communication terminal 400 then transfers information on the home network device to the first mobile communication terminal 300 in step 1117. The home network device list response message including the list of the home network devices includes the telephone number of the second mobile communication terminal 400 and the hash values of the authentication key $R_A$ and the authentication key $R_B$.

The steps up to step 1117 are preparatory steps for connection of the high-definition home network telephony service, and the steps after step 1117 are operated after a user actually controls the device for the high-definition home network telephony service.

In step 1117, the first mobile communication terminal 300 receiving the home network device list authenticates the corresponding home network device list response message as an effective message by using the telephone number and the hash values of the authentication key $R_A$ and the authentication key $R_B$ included in the home network device list response message.

The first mobile communication terminal 300 then selects the home network device, i.e., the first television 600, for providing the home network telephony service according to the selection of the user in step 1119. The first mobile communication terminal 300 then acquires an SIP URI address of the first television 600 in steps 1121 and 1123.

The first mobile communication terminal 300 transfers the SIP URI address of the first television 600 to the second mobile communication terminal 400 by using the REST message for performing the home network telephony service in step 1125. A call initiation request message including the SIP URI address of the first television 600 is a message requesting a call switch according to the provision of the home network telephony service. The call initiation request message includes the telephone number of the first mobile communication terminal 300 and the hash values of the authentication key $R_A$ and the authentication key $R_B$.

The second mobile communication terminal 400 receiving the call initiation request message in step 1125 determines whether the call initiation request message is transferred from an appropriate user in step 1127. That is, the second mobile communication terminal 400 determines whether the telephone number included in the call initiation request message is identical to the telephone number of the first mobile communication terminal 300 having the phone communication connection in step 1100, and identifies the hash values of the authentication key $R_A$ and the authentication key $R_B$.

As a result of the authentication, when the second mobile communication terminal 400 determines that the call initiation request message is appropriate, the second mobile communication terminal 400 selects a device, e.g., the second television 700, to perform the home network telephony service according to an input of the user in step 1129. The second mobile communication terminal 400 then transfers the address of the first television 600 to the second television 700 by sending a call initiation message for the initiation of the home network telephony service to the second television 700, in step 1131.

The second television 700 transmits a response indicating whether the call initiation message received in step 1133 has been processed normally to the second mobile communication terminal 400 in step 1133. The second mobile communication terminal 400 configures a response indicating whether the received call initiation message has been processed normally in response to the request made in step 1125 according to contents of the response in step 1133 and transfers the configured response to the first mobile communication terminal 300 in step 1135.

In step 1137, the first mobile communication terminal 300 and the second mobile communication terminal 400 modify the phone call. For example, it is set such that a voice communication is maintained through the first mobile communication terminal 300 and the second mobile communication terminal 400 and the video according to the phone communication is transmitted/received through the first television 600 and the second television 700 in step 837 in step 1139. The first television 600 and the second television 700 are connected through the home network and a backbone network connected to the home network. The voice communication and the video communication are processed with one session.

In the embodiment, an example of the case where the short message is used along with the REST message has been described. However, steps 907 and 909 may be performed through the short message as illustrated in FIGS. 8 and 10.

The short message transmitted to the second mobile communication terminal 400 in step 1003 may include information indicating an initialization message for the home network telephony service, the telephone number of the first mobile communication terminal 300, and the authentication key $R_A$, instead of information making the request of the address of the REST server. Moreover, the short message transmitted to the first mobile communication terminal 300 in step 1005 may include contents of the response to the initialization message, the telephone number of the second mobile communication terminal 400, the authentication key RA, and the authentication key $R_B$.

Even when the message used in steps 1007 and 1009 is the short message, contents or information included in the corresponding message may be the same as in steps 907 and 909.

The process illustrated in FIG. 10 is similar to that of FIG. 9, but differs in that steps 1209, 1217, 1255, and 1235 use the short message. A short message transmitted to the second mobile communication terminal 400 in step 1205 may include information indicating an initialization message for the home network telephony service, the telephone number of the first mobile communication terminal 300, and the authentication key $R_A$ instead of information making the request of the address of the REST server. Further, the short message transmitted to the first mobile communication terminal 300 in step 1207 may include contents of the response to the initialization message, the telephone number of the second mobile communication terminal 400, the authentication key RA, and the authentication key $R_B$.

Even if the message used in steps 1209, 1217, 1225, and 1235 is the short message, contents or information included in the corresponding message may be the same as steps 1109, 1117, 1125, and 1135 of FIG. 9 and the processing procedure is similar to FIG. 9, except for the usage of the SMS transmission/reception modules 302 and 402.

Steps 1201, 1203, 1211, 1213, 1215, 1221, 1223, 1227, 1229, 1231, 1233, 1237, and 1239 correspond to steps 1101, 1103, 1111, 1113, 1115, 1121, 1123, 1127, 1129, 1131, 1133, 1137, and 1139, respectively.

In the embodiments of FIGS. 8 and 10, the short message having a format represented in Table 1 below may be used.

TABLE 1

<<Text to distinguish normal SMS defined by UPnP>
C:  Message category
T: Message type
A: argument of message
H: authentication code
<eom>

An example of the short message is shown in Table 2.

TABLE 2

Message category : Batch
   Message type : HD call setup
      Argument : SIP URI
Message category : Action
   Message type : EnhancedInitiateCall
      Argument: SIP URI, Cookie
Message category : etc
   Message type : Initiate
      Argument : Random number A
Message type : Initiate Response
      Argument : Random number A, Random number B Next, a process of providing the home network telephony service according to an embodiments of the present invention will be described with reference to FIGS. 11 through 14. It is assumed in the third embodiment of the present invention that the mobile communication terminals to provide the home network telephony service authenticate each other as illustrated in the first and second embodiments of the present invention.

Figure 11:
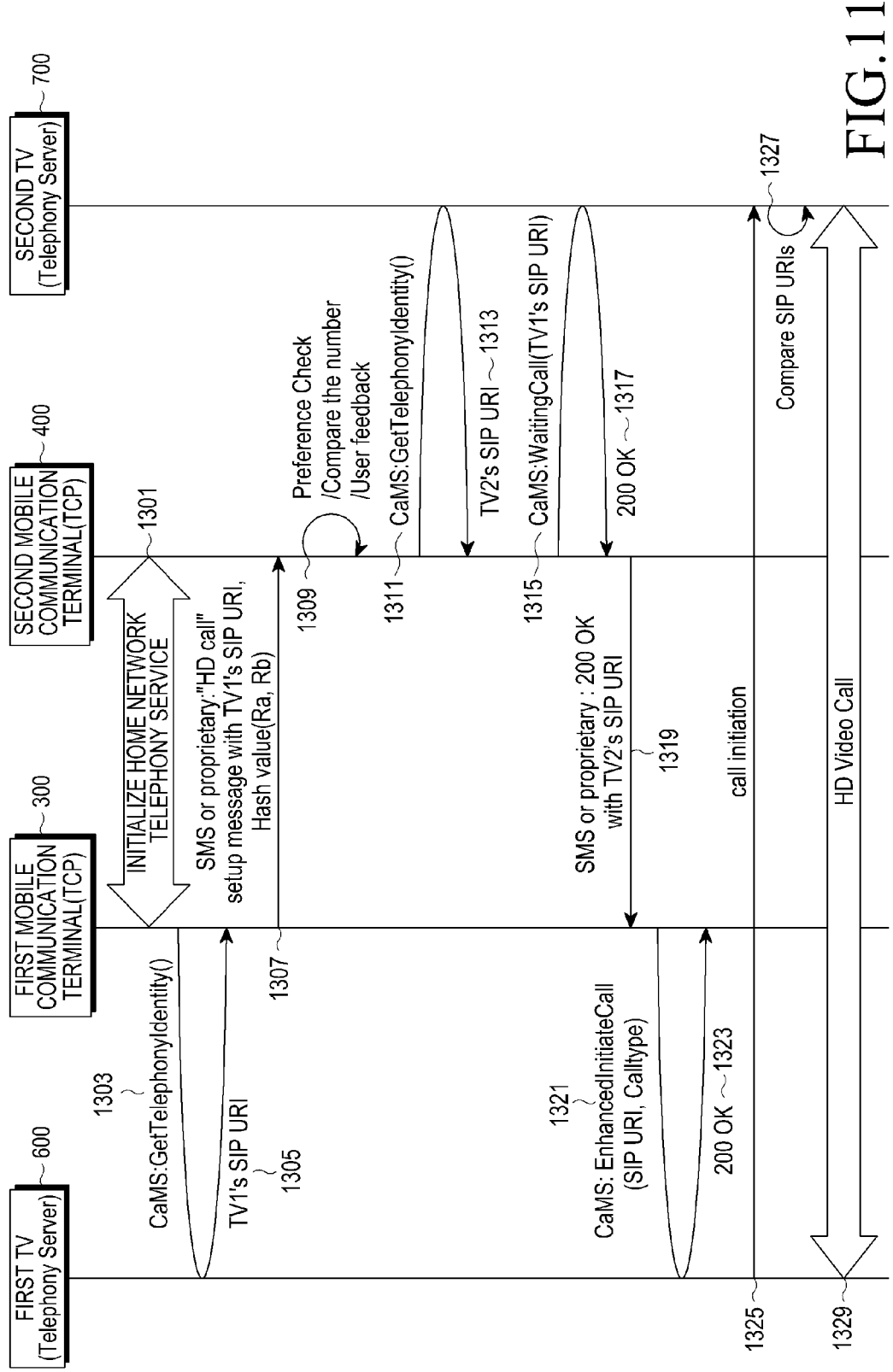
FIGS. 11 to 14 are flowcharts illustrating a process of providing a UPnP telephony service according to an embodiment of the present invention.
Figure 12:
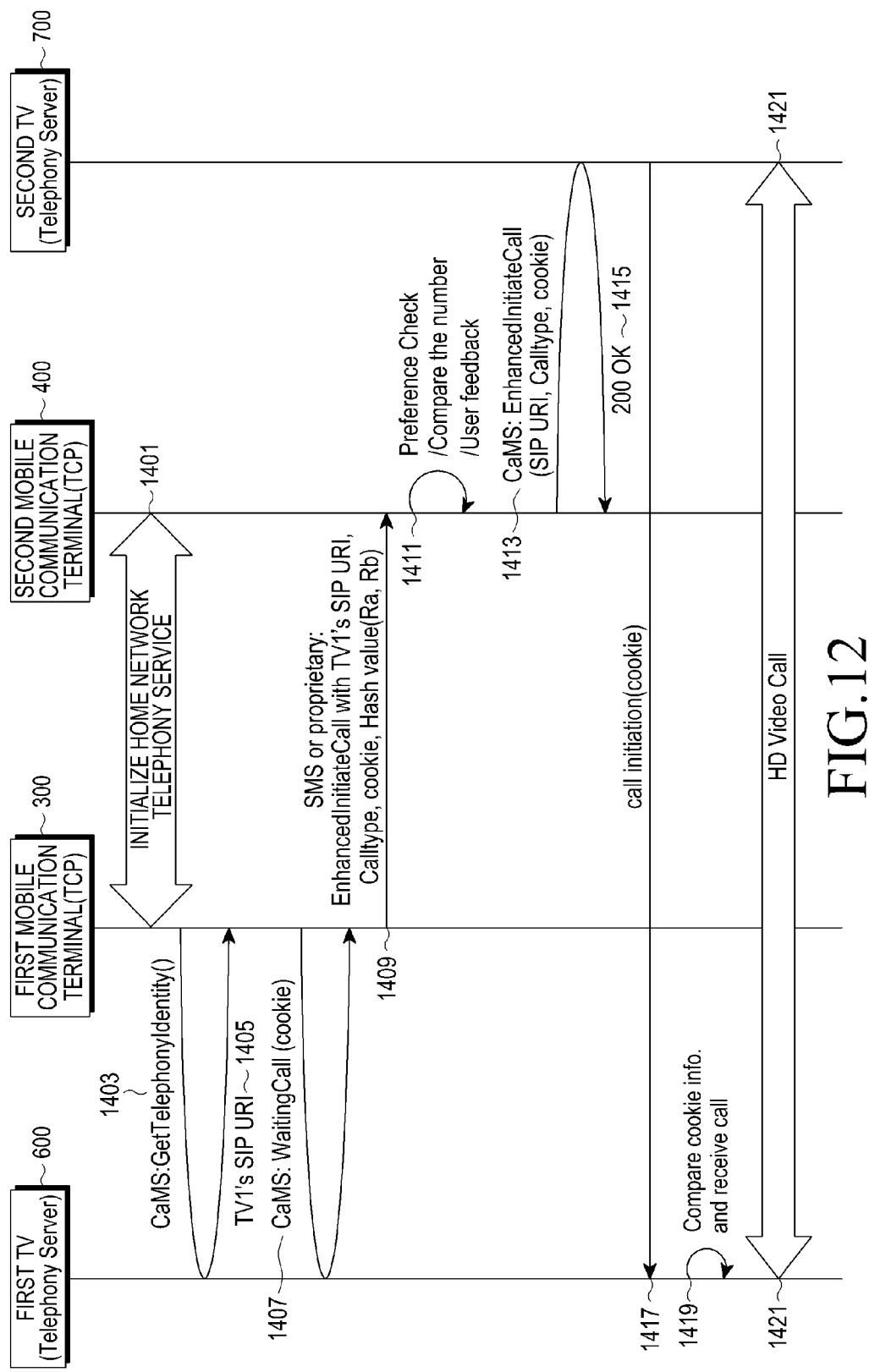
Figure 13:
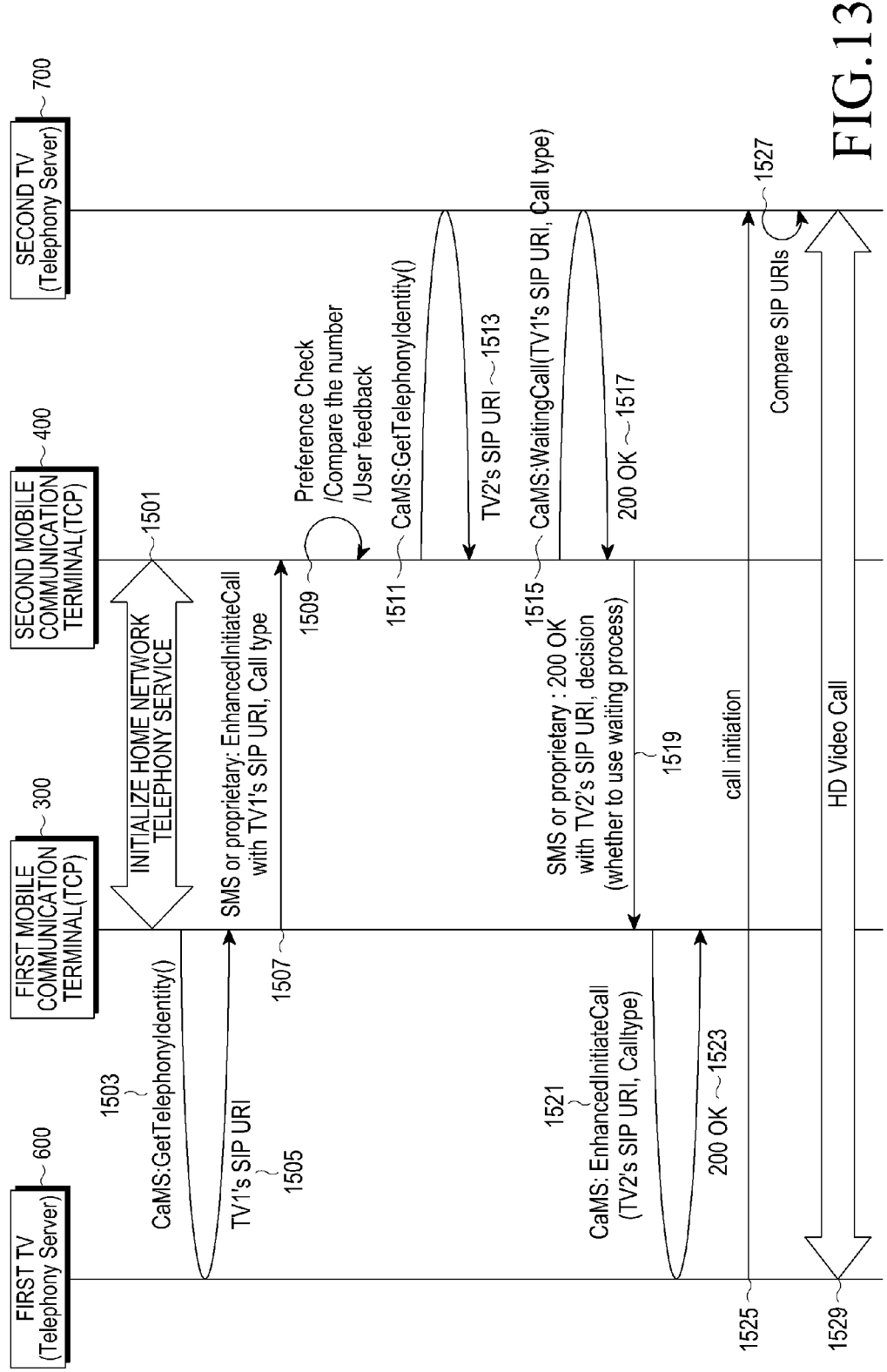
Figure 14:
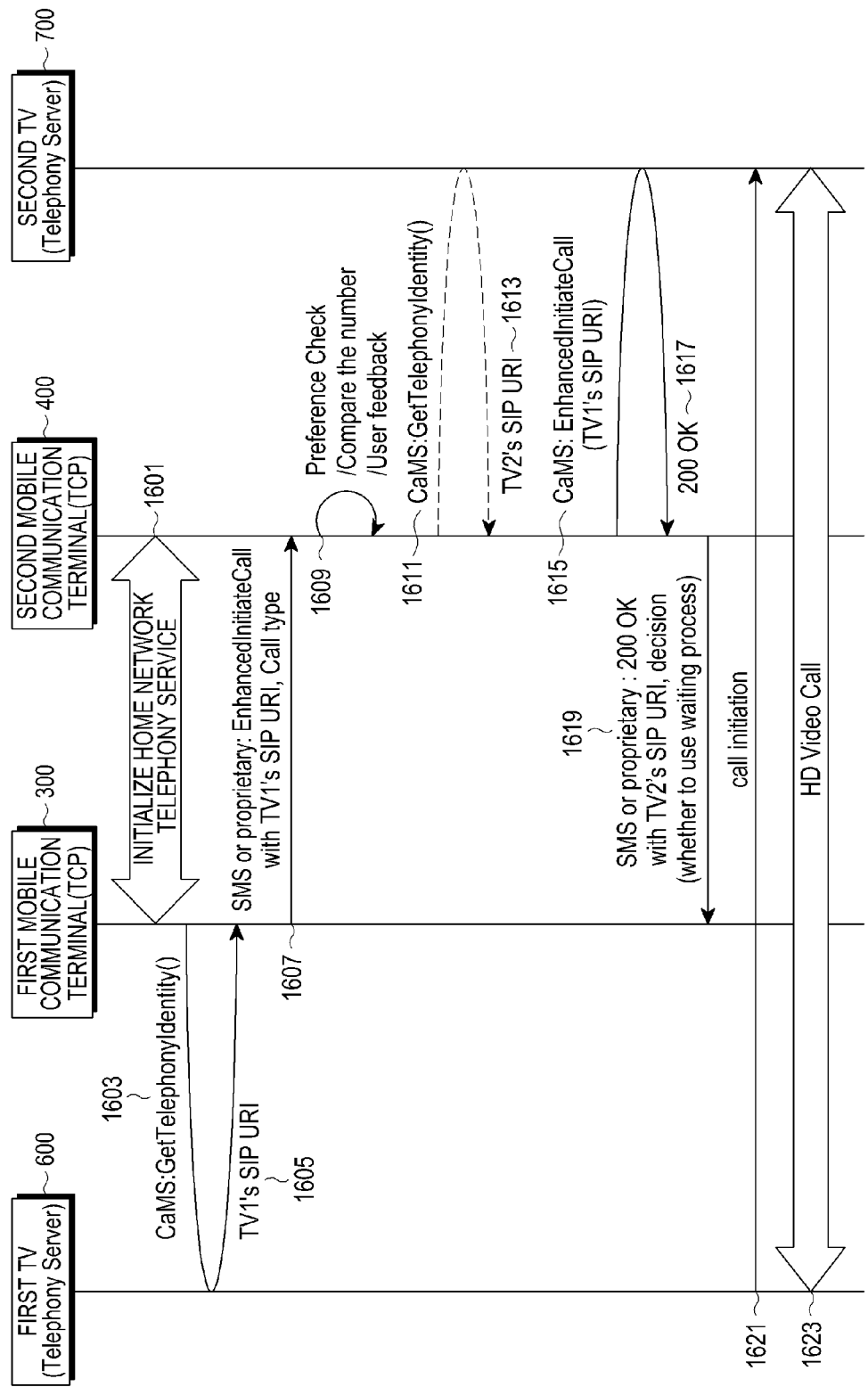

Call connection to the televisions 600 and 700 is waiting in advance such that the connection between the mobile communication terminals 300 and the second mobile communication terminal 400 and the home network devices, i.e., the televisions 600 and 700, subject to the a call switch is rapidly performed. A detailed process will be described with reference to FIGS. 11 through 14. FIGS. 11 and 13 illustrate an example in which the first mobile communication terminal 300 making a request for a call switch for the home network telephony service makes a request for a call connecting waiting to the second mobile communication terminal 400, and FIGS. 12 and 14 illustrates an example in which the first mobile communication terminal 300 performs the call connection waiting.

Referring to FIG. 11, the first mobile communication terminal 300 and the second mobile communication terminal 400 perform an initialization process for the home network telephony service in step 1301. The initialization process for the home network telephony service is a process of initiating the home network telephone service between two phone communication connected communication terminals and setting a home network telephony service environment. For example, the initialization process for the home network telephony service corresponds to steps 800 to 817, steps 1100 to 1119, or steps 1200 to 1219.

When the initialization process for the home network telephony service is completed, the first mobile communication terminal 300 acquires an SIP URI address from one network device, i.e., the first television 600, corresponding to a selection of the user in order to provide the home network telephony service in steps 1303 and 1305.

The first mobile communication terminal 300 transfers the SIP URI address of the first television 600 to the second mobile communication terminal 400 by using the short message for performing the home network telephony service in step 1307. A call-setting request message including the SIP URI address of the first television 600 is a message for making a request for an environment set-up according to the provision of the home network telephony service, and includes the telephone number of the first mobile communication terminal 300 and the hash values of the authentication key $R_A$ and the authentication key $R_B$. Further, the call-setting request message according to the third embodiment of the present invention includes a value of a cookie for a call connection waiting request and a call connection waiting.

The second mobile communication terminal 400 receiving the call-setting request message in step 1307 determines whether the call-setting request message is transmitted from an appropriate user in step 1309. That is, the second mobile communication terminal 400 determines whether the telephone number included in the call-setting request message is identical to the telephone number of the first mobile communication terminal 300 and identifies the hash values of the authentication key $R_A$ and the authentication key $R_B$.

As a result of the identification, when the second mobile communication terminal 400 determines that the call setting request is appropriate, the second mobile communication terminal 400 acquires the SIP URI address from a device, i.e., the second television 700, to perform the home network telephony service according to an input of a user in steps 1311 and 1313.

The second mobile communication terminal 400 then transmits a call connection waiting request message to the second television in step 1315. The call connection waiting request message includes a value of a cookie for waiting of the received call connection.

When the second television 700 successfully receives the call connection waiting request message, the second television 700 transmits a response to the call connection waiting request message to the second mobile communication terminal 400 in step 1317.

The second mobile communication terminal 400 responds indicating that an environment setting for providing the home network telephony service has been completed to the first mobile communication terminal 300 in step 1319. A response message includes the SIP URI address of the second television 700.

Accordingly, the first mobile communication terminal 300 transmits a call initiation request message to the first television 600 according to the home network telephone service in step 1321. The call initiation request message includes the SIP URI address of the second television 700, a type of call, and the value of the cookie for the call connection waiting of step 1315.

The first television 600 makes a request for a call connection to the second television 700 according to the home network telephony service in step 1325. A call connection request message includes the value of the cookie for the call connecting waiting of step 1307.

The second television 700 compares the value of the cookie included in the message received in step 1325 and the value of the cookie received along with the call connection waiting request message in step 1315. When the value of the cookie included in the message received in step 1325 is identical to the value of the cookie received along with the call connection waiting request in step 1315, the second television 700 directly connects the phone call with the first television 600, to perform the communication in step 1329, without receiving a connection authentication from the second mobile communication terminal 400.

As described above, according to the setting of the call connection waiting request, it is possible to omit a step of authenticating every call connection by the user or reduce resources used for authenticating the call connection in the mobile communication terminal.

In FIG. 13, the first mobile communication terminal 300 and the second mobile communication terminal 400 perform an initialization step for the home network telephony service in step 1401. The initialization step for the home network telephony service correspond to steps 800 to 817, steps 1100 to 1119, or steps 1200 to 1219.

When the initialization step for the home network telephony service is completed, the first mobile communication terminal 300 acquires an SIP URI address from one network device, i.e., the first television 600, corresponding to a selection of the user in order to provide the home network telephony service in steps 1403 and 1405.

The first mobile communication terminal 300 transmits a call connection waiting request message to the first television 600 in step 1407. The call connection waiting request message includes a value of a cookie for a call connection waiting.

The first mobile communication terminal 300 transfers the SIP URI address of the first television 600 to the second mobile communication terminal 400 by using the short message for performing the home network telephony service in step 1409. A call initiation request message including the SIP URI address of the first television 600 is a message for making a request for a call initiation for the provision of the home network telephony service, and includes the telephone number of the first mobile communication terminal 300 and the hash values of the authentication key $R_A$ and the authentication key $R_B$. Further, the call initiation request message according to the third embodiment of the present invention includes a value of a cookie for a call connection waiting.

The second mobile communication terminal 400 receiving the call initiation request message in step 1409 determines whether the call initiation request message is transmitted from an appropriate user in step 1411. That is, the second mobile communication terminal 400 determines whether the telephone number included in the call initiation request message is identical to the telephone number of the first mobile communication terminal 300 having the phone communication connection in step 1401 and identifies the hash values of the authentication key $R_A$ and the authentication key $R_B$.

As a result of the identification, when the second mobile communication terminal 400 determines that the call initiation request is appropriate, the second mobile communication terminal 400 transmits a call initiation message for initiation of the home network telephony service to a device, i.e., the second television 700, to perform the home network telephony service according to an input of a user in step 1413. The call initiation message includes the address of the first television 600 and the value of the cookie for the call connection waiting received in step 1409.

When the second television 700 successfully receives the call connection waiting request message, the second television 700 transmits a response to the call connection waiting request message to the second mobile communication terminal 400 in step 1415.

The second television 700 makes a request for the call initiation according to the home network telephony service to the first television 600 in step 1417. A call initiation request message includes the value of the cookie for the call connection waiting of step 1409.

In step 1419, the first television 600 compares the value of the cookie included in the message received in step 1417 and the value of the cookie received along with the call connection waiting request message in step 1407. When the value of the cookie included in the message received in step 1417 is identical to the value of the cookie received along with the call connection waiting request message in step 1407, the first television 600 directly connects the phone call with the second television 700, to perform the communication in step 1421, without receiving a connection authentication from the first mobile communication terminal 300.

As described above, according to the setting of the call connection waiting request, it is possible to omit a process of authenticating every call connection by the user or reduce resources used for authenticating the call connection in the mobile communication terminal.

FIGS. 13 and 14 illustrate a process of providing the UPnP telephony service according to embodiments of the present invention. It was assumed in the embodiment of FIGS. 11 and 12 that the first mobile communication terminal 300 transmits the value of the cookie, and the telephone number and the authentication key for the authentication when the first mobile communication terminal 300 transmits the message for the call connection waiting to the second mobile communication terminal 400. FIGS. 13 and 14 illustrate a case in which the value of the cookie is not used.

According to another embodiment of the present invention, even when the initialization process for the telephony service by using the authentication information, which is illustrated in the first or second embodiment, is not performed, the process illustrated in FIGS. 13 and 14 may be performed. That is, even when the initialization process of the telephony service is performed by using the address request message, the initialization message, or the device list request message and the response message with respect to the aforementioned messages including no authentication information, the process illustrated in FIGS. 13 and 14 may be performed.

In FIGS. 13 and 14, it is assumed that the mobile communication terminals 300 and 400 have a phone communication connection and home network devices subject to the switch of the phone call are televisions 600 and 700. FIG. 13 illustrates an example in which the second mobile communication terminal 400 performs the call connection waiting and FIG. 14 illustrates an example in which the first mobile communication terminal 300 performs the call connection waiting.

Referring to FIG. 13, the first mobile communication terminal 300 and the second mobile communication terminal 400 perform the initialization process for the home network telephony service in step 1501. The initialization process for the home network telephony service corresponds to steps 800 to 817, steps 1100 to 1119, or steps 1200 to 1219. Otherwise, the initialization process of step 1501 may include using no authentication information according to another embodiment of the present invention.

When the initialization process for the home network telephony service is complete, the first mobile communication terminal 300 acquires an SIP URI address from one network device, i.e., the first television 600, corresponding to a selection of the user in order to provide the home network telephony service in steps 1503 and 1505.

The first mobile communication terminal 300 transfers the SIP URI address of the first television 600 to the second mobile communication terminal 400 by using the short message for performing the home network telephony service in step 1507. A call initiation request message including the SIP URI address of the first television 600 is a message for making a request for an environment setting for the provision of the home network telephony service, and includes information regarding a call type. Further, the call initiation request message includes a call connection waiting request message according to the third embodiment of the present invention. The information on the call type includes set-up information on the call established by the home network telephony service. For example, the information on the call type includes a quality of audio and a resolution of video configuring the call provided by the home network telephony service.

The second mobile communication terminal 400 receiving the call initiation request message in step 1507 identifies a user preference for the call connection waiting request in step 1509. That is, when the home network telephony service is performed, the user preference for the omission of a process of receiving a permission for a final call connection from a device including the telephony control point or a user by the home network device subject to the call switch is identified.

The user preference for the call connection waiting request is stored in the second mobile communication terminal 400 in the form of a preference value. Otherwise, the second mobile communication terminal 400 displays a message identifying whether to permit or output a guide voice to receive an input of the user regarding whether to permit the call connection waiting request in step 1509. The second mobile communication terminal 400 may receive an input of the selection of the device, i.e., the second television 700, to perform the home network telephony service. Otherwise, a pre-designated device may exist.

Then, the second mobile communication terminal 400 acquires the SIP URI address from the device, i.e., the second television 700, to perform the home network telephone service in steps 1511 and 1515. If the second mobile communication terminal 400 has been aware of the SIP URI address of the second television 700, steps 1511 and 1515 may be omitted.

As a result of the identification of the user preference in step 1509, when the user preference is for the permission of the call connection waiting request, the second mobile communication terminal 400 transmits a call connection waiting request message to the second television 700. The call connection waiting request message includes the SIP URI address of the first television 600 received in step 1507 and includes information on the call type.

When the second television 700 successfully receives the call connection waiting request message, the second television 700 transmits a response to the call connection waiting request to the second mobile communication terminal 400.

The second mobile communication terminal 400 responds indicating that an environment setting for providing the home network telephony service to the first mobile communication terminal 300 in step 1519. A response message includes the SIP URI address of the second television 700 and contents of the response to the call connection waiting request. The contents of the response to the call connection waiting request may be a value indicating that the call connection waiting is set according to the permission of the call connection waiting or a value indicating a rejection of the call connection waiting.

When the response message includes the value indicating that the call connection waiting is set, the first mobile communication terminal 300 receiving the response message transmits a call initiation request message according to the home network telephony service to the first television 600 in step 1521. The call initiation request message includes the SIP URI address of the second television 700 and the information on the call type.

The first television 600 makes a request for the call connection according to the home network telephony service to the second television 700 in step 1525.

In step 1527, the second television 700 compares the SIP URI address of the first television 600 included in the message received in step 1525 and the SIP URI address received along with the call connection waiting request in step 1515. When the SIP URI address of the first television 600 included in the message received in step 1525 is identical to the SIP URI address received along with the call connection waiting request in step 1515, the second television 600 directly connects the phone call with the first television 600 without receiving a connection permission from the second mobile communication terminal 400 to perform the communication in step 1529.

As described above, according to the setting of the call connection waiting request, it is possible to omit a process of permitting every call connection by the user or reduce resources used for permitting the call connection in the mobile communication terminal.

FIG. 14 illustrates a process of an operation when the call connection waiting is rejected as a result of the identification of the user preference in step 1509 of FIG. 13. Accordingly, steps 1601 to 1611 of FIG. 14 correspond to steps 1501 to 1511 of FIG. 13, respectively.

Referring to FIG. 14, when the user rejects the call connection waiting request as a result of the identification of the user preference in step 1609, the second mobile communication terminal 400 transmits the call initiation request message to the second television 700 in step 1615. The call initiation request message includes the SIP URI address of the first television 600 received in step 1607 and the information on the call type.

When the second television 700 successfully receives the call initiation request message, the second television 700 transmits a response to the call initiation request message to the second mobile communication terminal 400 in step 1617.

The second mobile communication terminal 400 responds indicating that an environment setting has been completed for providing the home network telephony service to the first mobile communication terminal 300 in step 1619. The response message includes the SIP URI address of the second television 700 and contents, i.e., a value indicating the rejection of the call connection waiting, of the response to the call connection waiting request.

The first mobile communication terminal 300 and the second mobile communication terminal 400 modify the phone call when the response message transmitted to the first mobile communication terminal 300 includes the value indicating the rejection of the call connection waiting. For example, it is set such that a voice communication is maintained through the first mobile communication terminal 300 and the second mobile communication terminal 400 and the video according to the phone communication is transmitted and received through the first television 600 and the second television 700.

The second television 700 then transmits the call connection request message according to the home network telephony service to the first television 600 in step 1621, and connects the phone call with the first television 600 to perform the communication in step 1623.

Embodiments of the present invention can be implemented by hardware (for example, a computer), software, and a combination of the hardware and the software. For example, the software can be stored in volatile or non-volatile storage devices such as a ROM, memories such as a RAM, a memory chip, a device or an integrated circuit, and optically or magnetically recordable and machine-readable storage media such as a CD, a Digital Versatile Disc (DVD), a magnetic disk, a magnetic tape, and the like, in re-writable or fixed formats. A storage unit, which can be included in the mobile communication terminal, is an example of a program including instructions for implementation of the embodiments of the present invention or the machine-readable storage media suitable for storing the programs. Therefore, embodiments of the present invention may include a program that includes a code for implementing the described systems and methods, and may further include machine-readable storage media for storing such a program. Further, the program can be electronically transferred by certain media such as a communication signal transmitted through a wired or wireless connection, and embodiments of the present invention further include various equivalents thereof.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method of providing a home network telephony service by a first mobile communication terminal, the method comprising:
   connecting a phone call to a second mobile communication terminal;
   transmitting a first call initiation request message including an address of a first electronic device, in response to the phone call, to the second mobile communication terminal; and
   receiving a response message in response to the first call initiation request message, from the second mobile communication terminal;
   wherein the first call initiation request message is a message for requesting to switch the phone call to a phone call for the home network telephony service between the first electronic device and a second electronic device,
   wherein the first electronic device is connected to a home network of the first mobile communication terminal and performs the home network telephony service, and
   wherein the second electronic device is connected to a home network of the second mobile communication terminal; and
   switching the phone call from the first mobile communication terminal and the second mobile communication terminal to the first electronic device and the second electronic device.

2. The method of claim 1, further comprising:
   transmitting a second call initiation request message, including an address of the second electronic device and for requesting to originate the phone call for the home network telephony service, by the second electronic device,
   when the response message includes information indicating address of the second electronic device and that a call connection waiting is set,
   wherein the call connection waiting is a waiting state for the phone call connection between the second electronic device and the first electronic device, without permission of the second mobile communication terminal, according to transmission of a call initiation request to the second electronic device by the first electronic device.

3. A method of providing a home network telephony service by a first mobile communication terminal, the method comprising:
   connecting a phone call to a second mobile communication terminal;
   receiving a call initiation request message including an address of a second electronic device connected to a home network of the second mobile communication terminal, in response to the phone call from the second mobile communication terminal;
   determining whether a call connection waiting is set; and
   transmitting a call connection waiting request message, including the address of the second electronic device, to a first electronic device, when determining that the call connection waiting is set,
   wherein the call initiation request message is a message for requesting to switch the phone call to a phone call for the home network telephony service between the first electronic device and the second electronic device, and
   wherein the first electronic device is connected to a home network of the first mobile communication terminal and performs the home network telephony service.

4. The method of claim 3, further comprising:
   transmitting, when the call connection waiting is set, a response message including information indicating that the call connection waiting is set and an address of the first electronic device, to the second mobile communication terminal; and
   transmitting, when the call connection waiting is not set, a call connection request message, including the address of the second electronic device and a request to the first electronic device to originate a call, to the second electronic device,
   wherein the call connection waiting is a waiting state for a phone call connection between the first electronic device and the second electronic device, without permission of the first mobile communication terminal, according to transmission of a call initiation request to the first electronic device by the second electronic device.

5. A system for providing a home network telephony service, the system comprising:
   a first mobile communication terminal that connects a phone call to a second mobile communication terminal, transmits a first call initiation request message including an address of a first electronic device, in response to the phone call, to the second mobile communication terminal, and receives a response message in response to the first call initiation request message, from the second mobile communication terminal; and
   the first electronic device that provides the address of the first electronic device, according to a request of the first mobile communication terminal,
   wherein the first call initiation request message is a message for requesting to switch the phone call to a phone call for the home network telephony service between the first electronic device and a second electronic device,
   wherein the first electronic device is connected to a home network of the first mobile communication terminal and performs the home network telephony service, and
   wherein the second electronic device is connected to a home network of the second mobile communication terminal; and
   switching the phone call from the first mobile communication terminal and the second mobile communication terminal to the first electronic device and the second electronic device.

6. The system of claim 5, wherein the first mobile communication terminal transmits a second call initiation request message, including an address of the second electronic device and requesting to the first electronic device to originate the phone call for the home network telephony service, to the second electronic device, when the response message includes the address of the second electronic device and information indicating that a call connection waiting is set,
   wherein the second electronic device is connected to a home network of the second mobile communication terminal, wherein the first electronic device transmits a call connection request message to the second electronic device to connect a call corresponding to the phone call connection when receiving the request to the first electronic device originate the phone call, and wherein the call connection waiting is a waiting state for the phone call connection between the second electronic device and the first electronic device, without permission of the second mobile communication terminal, according to transmission of a call initiation request to the second electronic device by the first electronic device.

7. A system for providing a home network telephony service, the system comprising:

a first mobile communication terminal that connects a phone call to a second mobile communication terminal, receives a call initiation request message, including an address of a second electronic device connected to a home network of the second mobile communication terminal, and information on a type of phone communication data to be allocated to the second electronic device, determines whether a call connection waiting is set, and transmits a call connection waiting request message including the address of the second electronic device, to a first electronic device, when determining that the call connection waiting is set; and the first electronic device that provides an address of the first electronic device, according to a request of the first mobile communication terminal, and sets the call connection waiting, when receiving the call connection waiting request message, wherein the call initiation request message is a message for requesting to switch the phone call to a phone call for the home network telephony service between the first electronic device and the second electronic device, and wherein the first electronic device is connected to a home network of the first mobile communication terminal and performs the home network telephony service.

8. The system of claim 7, wherein the first mobile communication terminal transmits a response message, including information indicating that the call connection waiting is set and the address of the first electronic device, to the second mobile communication terminal, when the call connection waiting is set, and transmits a call connection request message, including the address of the second electronic device and a request to the first electronic device to originate a call, to the second electronic device, when the call connection waiting is not set, and wherein the first electronic device connects the phone call for the home network telephony service with the second electronic device, without permission of the first mobile communication terminal, when receiving a call connection request from the second electronic device.

9. A first mobile communication terminal in a system that provides a home network telephony service, the first mobile communication terminal comprising:

a transmitter that transmits messages to other devices;

a receiver that receives messages from the other devices; and a control point module that connects a phone call to a second mobile communication terminal, transmits, through the transmitter, a first call initiation request message including an address of a first electronic device, in response to the phone call, to the second mobile communication terminal, and receives, through the receiver, a response message in response to the first call initiation request message from the second mobile communication terminal, wherein the first call initiation request message is a message for requesting to switch the phone call to a phone call for the home network telephony service between the first electronic device and a second electronic device, wherein the first electronic device is connected to a home network of the first mobile communication terminal and performs the home network telephony service, and wherein the second electronic device is connected to a home network of the second mobile communication terminal; and switching the phone call from the first mobile communication terminal and the second mobile communication terminal to the first electronic device and the second electronic device.

10. The first mobile communication terminal of claim 9, wherein the control point module transmits a second call initiation request message, including an address of the second electronic device and requesting to the first electronic device to originate the phone call for the home network telephony service, to the second electronic device, when the response message includes the address of the second electronic device and information indicating that a call connection waiting is set, wherein the second electronic device is connected to a home network of the second mobile communication terminal, and wherein the call connection waiting is a waiting state for the phone call connection between the second electronic device and the first electronic device, without permission of the second mobile communication terminal, according to transmission of a call initiation request to the second electronic device by the first electronic device.

11. A first mobile communication terminal in a system that provides a home network telephony service, the first mobile communication terminal comprising:

a transmitter that transmits messages to other devices;

a receiver that receives messages from the other devices; and a control point module that connects a phone call to a second mobile communication terminal, receives, through the receiver, a call initiation request message including an address of a second electronic device connected to a home network of the second mobile communication terminal in response to the phone call from the second mobile communication terminal, determines whether a call connection waiting is set, and transmits a call connection waiting request message including the address of the second electronic device to the first electronic device, when determining that the call connection waiting is set, wherein the call initiation request message is a message for requesting to switch the phone call to a phone call for the home network telephony service between the first electronic device and the second electronic device, and wherein the first electronic device is connected to a home network of the first mobile communication terminal and performs the home network telephony service.

12. The first mobile communication terminal of claim 11, wherein the control point module further transmits, through the transmitter, a response message including information indicating that the call connection waiting is set and an address of the first electronic device, to the second mobile communication terminal, when the call connection waiting is set, and transmits a call connection request message, including the address of the second electronic device and a request to the first electronic device to originate the phone call for the home network telephony service, to the second electronic device, when the call connection waiting is not set, and wherein the call connection waiting is a waiting state for the phone call connection between the first electronic device and the second electronic device, without permission of the first mobile communication terminal, according to transmission of a call initiation request to the first electronic device by the second electronic device.

13. A non-transitory computer-readable storage medium having recorded thereon a program for executing a method for providing a home network telephony service by a first mobile communication terminal, the method comprising:

connecting a phone call to a second mobile communication terminal;

transmitting a first call initiation request message including an address of a first electronic device, in response to the phone call to the second mobile communication terminal;

receiving a response message in response to the first call initiation request message, from the second mobile communication terminal; and transmitting a second call initiation request message requesting the first electronic device to originate a call, wherein the call initiation request message is a message for requesting to switch the phone call to a phone call for the home network telephony service between the first electronic device and a second electronic device, wherein the first electronic device is connected to a home network of the first mobile communication terminal and performs the home network telephony service, and wherein the second electronic device is connected to a home network of the second mobile communication terminal; and switching the phone call from the first mobile communication terminal and the second mobile communication terminal to the first electronic device and the second electronic device.

14. The non-transitory computer-readable storage medium of claim 13, further comprising:

transmitting a second call initiation request message, including an address of the second electronic device, and requesting to the first electronic device to originate the phone call for the home network telephony service, to the second electronic device, wherein the second electronic device is connected to a home network of the second mobile communication terminal.

15. A non-transitory computer-readable storage medium having recorded thereon a program for executing a method for providing a home network telephony service by a first mobile communication terminal, in which the first mobile communication terminal having a phone call connection with a second mobile communication terminal provides a phone communication service by using a first electronic device connected to a home network of the first mobile communication terminal, the method comprising:

connecting a phone call to a second mobile communication terminal;

receiving a call initiation request message including an address of a second electronic device connected to a home network of the second mobile communication terminal, in response to the phone call from the second mobile communication terminal;

determining whether a call connection waiting is set; and transmitting a call connection waiting request message, including the address of the second electronic device, to the first electronic device, when determining that the call connection waiting is set, wherein the call initiation request message is a message for requesting to switch the phone call to a phone call for the home network telephony service between the first electronic device and the second electronic device, and wherein the first electronic device is connected to a home network of the first mobile communication terminal and performs the home network telephony service.

16. The non-transitory computer-readable storage medium of claim 15, further comprising:

transmitting a response message, including information indicating that the call connection waiting is set and an address of the first electronic device, to the second mobile communication terminal, when determining that the call connection waiting is set, and transmitting a call connection request message, including the address of the second electronic device and a request to the first electronic device to originate a call, to the second electronic device, when the call connection waiting is not set, wherein the call connection waiting is a waiting state for the phone call connection between the first electronic device and the second electronic device, without permission of the first mobile communication terminal, according to transmission of a call initiation request to the first electronic device by the second electronic device.

* * * * *